United States Patent
Chen et al.

(10) Patent No.: US 10,700,843 B2
(45) Date of Patent: Jun. 30, 2020

(54) METHOD AND DEVICE FOR INFORMATION TRANSMISSION IN MACHINE-TYPE COMMUNICATION SYSTEM

(71) Applicant: ZTE Corporation, Shenzhen, Guangdong Province (CN)

(72) Inventors: Xianming Chen, Shenzhen (CN); Bo Dai, Shenzhen (CN); Shuqiang Xia, Shenzhen (CN); Kun Liu, Shenzhen (CN); Jing Shi, Shenzhen (CN); Wen Zhang, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 130 days.

(21) Appl. No.: 15/752,005

(22) PCT Filed: Jun. 2, 2016

(86) PCT No.: PCT/CN2016/084546
§ 371 (c)(1),
(2) Date: Feb. 12, 2018

(87) PCT Pub. No.: WO2017/024874
PCT Pub. Date: Feb. 16, 2017

(65) Prior Publication Data
US 2018/0241535 A1    Aug. 23, 2018

(30) Foreign Application Priority Data

Aug. 12, 2015 (CN) .......................... 2015 1 0492355
Nov. 4, 2015 (CN) .......................... 2015 1 0742961

(51) Int. Cl.
*H04L 5/00* (2006.01)
*H04L 5/14* (2006.01)
(Continued)

(52) U.S. Cl.
CPC .............. *H04L 5/0073* (2013.01); *H04L 5/14* (2013.01); *H04W 48/10* (2013.01); *H04W 48/12* (2013.01);
(Continued)

(58) Field of Classification Search
CPC ... H04B 1/56; H04B 7/2656; H04W 72/0446; H04W 88/08; H04W 76/02
(Continued)

(56) References Cited

U.S. PATENT DOCUMENTS

2016/0037514 A1*  2/2016  Xiong ..................... H04W 4/70
                                                        370/336
2018/0152924 A1*  5/2018  Ouchi ................... H04W 48/10

FOREIGN PATENT DOCUMENTS

CN    103621147    2/2015
WO    2014185659   11/2014
(Continued)

OTHER PUBLICATIONS

International Search Report, International application No. PCT/CN2016/084546, dated Aug. 25, 2016.
(Continued)

*Primary Examiner* — Mark H Rinehart
*Assistant Examiner* — Sanjay K Dewan
(74) *Attorney, Agent, or Firm* — Ferguson Case Orr Paterson LLP

(57) ABSTRACT

Provided are a method and device for information transmission in a Machine Type Communication (MTC) system. The method includes that: a subframe set and a narrowband for transmitting first information are determined according to a Physical Cell Identity (PCID); and the first information is sent or received on the subframe set and the narrowband.

19 Claims, 3 Drawing Sheets

--- determine a subframe set and a narrowband for transmitting first information according to a PCID — 101 send or receive the first information on the subframe set and the narrowband — 102

(51) Int. Cl.
*H04W 4/70* (2018.01)
*H04W 48/10* (2009.01)
*H04W 72/00* (2009.01)
*H04W 48/12* (2009.01)

(52) U.S. Cl.
CPC ......... *H04W 72/005* (2013.01); *H04L 5/0012* (2013.01); *H04W 4/70* (2018.02)

(58) Field of Classification Search
USPC ........................................................ 370/280
See application file for complete search history.

(56) References Cited

FOREIGN PATENT DOCUMENTS

WO 2015018497 2/2015
WO WO 2015/018497 A1 * 2/2015 .............. H04W 4/00

OTHER PUBLICATIONS

TSG RAN WG1, "RP-150583; Status Report to TSG; Further LTE Physical Layer Enhancements for MTC," 3GPP TSG RAN Meeting #68, Jun. 18, 2015.

* cited by examiner

METHOD AND DEVICE FOR INFORMATION TRANSMISSION IN MACHINE-TYPE COMMUNICATION SYSTEM

TECHNICAL FIELD

The present disclosure relates to, but is not limited to, the technical field of wireless communications, in particular to a method and device for information transmission in a Machine Type Communication (MTC) system.

BACKGROUND

The MTC User Equipment (UE) has become a main application form of Internet of Things in the current stage, and its low consumption and low cost is an important guarantee for being applied on a large scale.

At present, according to transmission mechanisms of a System Information Block (SIB), related SIB types used for MTC can be divided into a first SIB1 and other SIBx except the SIB1, wherein x is not equal to 1. The SIB1 is transmitted by predefining and/or indicating scheduling information related to the SIB1 through a Master Information Block (MIB), and the SIBx is transmitted by indicating scheduling information related to the SIBx through the SIB1, wherein the scheduling information includes a subframe (time domain) position, a narrowband (frequency domain) position and a Transmission Block Size (TBS).

In view of uncertainty of the transmission block size, and in order to avoid complexity of blind detection of the UE, the transmission block size of the SIB1 is usually indicated by using MIB signaling; however, the number of extra bits that the related MIB signaling can bear is limited, and the rest extra MIB bits are required for extension of enhancements in future. So, in order to avoid the introduction of extra MIB signaling overhead, determining a subframe and a narrowband for SIB1 transmission by predefining is an optional transmission mode; however, in such case, to provide a method for information transmission, which can effectively prevent or reduce interferences caused by the SIB1 transmission between adjacent cells, has become a problem to be solved.

SUMMARY

The following is an overview of the theme elaborated in this application. The overview is not intended to limit the scope of protection of the claims.

In view of this, the disclosure is intended to provide a method and device for information transmission in an MTC system, which can effectively prevent or reduce interferences caused by system information transmission between adjacent cells, thereby improving user experience.

The technical solutions of the disclosure are implemented as follows.

According to an embodiment of the present disclosure, a method for information transmission in an MTC system is provided, and the method includes that: a subframe set and a narrowband for transmitting first information are determined according to a Physical Cell Identity (PCID); and the first information is sent or received on the subframe set and the narrowband.

In certain embodiments, before the subframe set and the narrowband for transmitting the first information are determined according to the PCID, the method further includes that: a candidate subframe set and a candidate narrowband set for transmitting the first information are acquired, wherein the candidate subframe set includes the subframe set, and the candidate narrowband set includes the narrowband.

In certain embodiments, acquiring the candidate narrowband set for transmitting the first information includes that: all narrowbands in a preset system bandwidth range are acquired; or other narrowbands, except the narrowbands for Physical Broadcast Channel (PBCH) transmission, in the preset system bandwidth range are acquired; or W narrowbands of all the narrowbands in the preset system bandwidth range are acquired. The W is a positive integer less than or equal to $N_{NB}$, and the $N_{NB}$ is the number of narrowbands in the system bandwidth range.

In certain embodiments, the W is an even number; the W narrowbands include W/2 narrowbands close to an upper sideband and W/2 narrowbands close to a lower sideband.

In certain embodiments, before the candidate narrowband set for transmitting the first information is acquired, the method further includes that: it is determined that there is no PBCH transmission in a subframe for transmitting the first information, and it is set that the candidate narrow set for transmitting the first information includes all the narrowbands in the system bandwidth range; or, it is determined that there is the PBCH transmission in the subframe for transmitting the first information, and it is set that the candidate narrow set for transmitting the first information includes other narrowbands, except the narrowbands for the PBCH transmission, in the system bandwidth range.

In certain embodiments, the MTC system is a Frequency Division Duplex (FDD) system; acquiring the candidate subframe set for transmitting the first information includes that:
  subframe #0, subframe #4, subframe #5 and subframe #9 in a radio frame are acquired; it is determined that at least one of the subframe #0, the subframe #4, the subframe #5 and the subframe #9 is a candidate subframe; and it is determined that the subframe set composed of the candidate subframes in all the radio frames is the candidate subframe set for transmitting the first information;
  or, the MTC system is a Time Division Duplex (TDD) system; acquiring the candidate subframe set for transmitting the first information includes that:
  the subframe #0 and the subframe #5 in the radio frame are acquired; it is determined that at least one of the subframe #0 and the subframe #5 is the candidate subframe; and it is determined that the subframe set composed of the candidate subframes in all the radio frame is the candidate subframe set for transmitting the first information.

In certain embodiments, the method further includes that: the candidate subframe is determined according to at least one of TBS, system bandwidth, functions supported by a cell, the number of narrowbands included in the candidate narrowband set and subframes for PBCH transmission.

In certain embodiments, determining the subframe set and the narrowband for transmitting the first information according to the PCID includes that:
  the candidate subframe set for transmitting the first information is divided into N subframe subsets; a belonging group of the PCID is determined according to a first rule; a group number n of the belonging group is acquired; and a subframe subset whose number is the same as the group number n is determined as the subframe set for transmitting the first information; wherein, the N is a positive integer, and the n is an integer less than the N;

the number M of the narrowbands included in the candidate narrowband set is acquired; the belonging group of the PCID is determined according to a second rule; a group number m of the belonging group is acquired; and a narrowband whose number is the same as the group number m is determined as the narrowband for transmitting the first information; wherein, the M is a positive integer, and the m is an integer less than the M.

In certain embodiments, each subframe subset includes B subframes in A radio frames, wherein the A is a positive integer; for the FDD system, the B is a positive integer greater than 1 and less than 4, or the B is equal to 1, or the B is equal to 4; for the TDD system, the B is 1 or 2.

In certain embodiments, determining the belonging group of the PCID according to the first rule includes that:
the belonging group of the PCID is determined according to a formula: n=mod(PCID,N);
correspondingly, determining the belonging group of the PCID according to the second rule includes that: the belonging group of the PCID is determined according to a formula: m=mod($\lfloor$PCID/N$\rfloor$,M).
wherein, the n and the m are the group numbers of the belonging groups of the PCID, the N is the number of subframe subsets included in the candidate subframe set, and the M is the number of narrowbands included in the candidate narrowband set.

In certain embodiments, determining the belonging group of the PCID according to the first rule includes that:
the belonging group of the PCID is determined according to a formula: n=mod($\lfloor$PCID/M$\rfloor$,N).
correspondingly, determining the belonging group of the PCID according to the second rule includes that: the belonging group of the PCID is determined according to a formula: m=mod(PCID,M);
the n and the m are the group numbers of the belonging group of the PCID, the N is the number of subframe subsets included in the candidate subframe set, and the M is the number of narrowbands included in the candidate narrowband set.

In certain embodiments, when narrowband frequency hopping of the first information is enabled, determining the narrowband for transmitting the first information according to the PCID includes that: the narrowband for transmitting the first information is determined according to the PCID, and a subframe index and/or a radio frame index for transmitting the first information.

In certain embodiments, the method further includes that:
in a first case, in the same subframe set, a gap between two narrowbands for transmitting the first information of two different cells is fixed;
in a second case, in the same subframe set, the gap between two narrowbands for transmitting the first information of two different cells is not fixed; the first case is different from the second case.

In certain embodiments, in the first case, determining the narrowband for transmitting the first information according to the PCID, and the subframe index and/or the radio frame index for transmitting the first information includes that:
the narrowband for transmitting the first information is determined according to a formula: m(Idx)=mod($\lfloor$PCID/N$\rfloor$+Idx,M) or m(Idx)=mod(PCID+Idx,M).
the Idx represents the subframe index or the radio frame index for transmitting the first information, the m(Idx) represents an index of the narrowband for transmitting the first information on the subframe or the radio frame whose index is the Idx, the N is the number of subframe subsets included in the candidate subframe set for transmitting the first information, and the M is the number of narrowbands included in the candidate narrowband set for transmitting the first information.

In certain embodiments, in the second case, determining the narrowband for transmitting the first information according to the PCID, and the subframe index and/or the radio frame index for transmitting the first information includes that:
a random collating sequence S corresponding to the PCID is acquired, and the narrowband for transmitting the first information is determined according to a formula m(Idx)=S{mod(Idx,M)}; the random collating sequence S includes M integers from 0 to (M−1);
the m(Idx) represents the index of the narrowband for transmitting the first information on the subframe or the radio frame whose index is the Idx, and the M is the number of narrowbands included in the candidate narrowband set for transmitting the first information.

In certain embodiments, the method further includes that: independent configuration signaling is used, through the first information, to indicate an actual transmission subframe of second information in a corresponding System Information (SI) window.

In certain embodiments, the first information is a first system information block SIB1, the second information is other system information block SIBx except the SIB1, wherein the x is a positive integer not equal to 1.

In certain embodiments, before the independent configuration signaling is used, through the first information, to indicate the actual transmission subframe of the second information in the corresponding SI window, the method further includes that:
a candidate subframe set for transmitting the second information in the SI window is divided into X subframe subsets in a first way or a second way, and it is determined that the actual transmission subframe of the second information in the corresponding SI window is at least one of the X subframe subsets; wherein, the first way is different from the second way, and the X is a positive integer.

In certain embodiments, the first way is a discontinuous subframe allocation way; dividing the candidate subframe set for transmitting the second information in the SI window into X subframe subsets in the first way includes that: every X continuous subframes in the candidate subframe set are divided into a group, and the subframes in each group are numbered; the subframe subset whose number is x is composed of the subframes whose number is x in each subframe group; wherein, the X is a positive integer, and the x is an integer less than or equal to X−1.

In certain embodiments, the second way is a continuous subframe allocation way; dividing the candidate subframe set for transmitting the second information in the SI window into X subframe subsets in the second way includes that: every ceiling (P/X) continuous subframes in the candidate subframe set are divided into a group; the subframe subset whose number is x is the divided subframe group whose number is x; wherein, the P represents the number of subframes included in the candidate subframe set, the X is a positive integer, and the x is an integer less than or equal to X−1.

In certain embodiments, determining that the actual transmission subframe of the second information in the corresponding SI window is at least one of the X subframe subsets includes that:

it is determined that the actual transmission subframe of the second information in the corresponding SI window is at least one of the X subframe subsets according to at least one of the current coverage enhancement level, covering target, and TBS of the second information.

In certain embodiments, the independent configuration signaling indicates that the number of bits required by the actual transmission subframe of the second information in the corresponding SI window is Y;

$Y=2^x-1$ or $Y=\text{ceiling}(\log_2 X)$, wherein the X is the number of subframe sets included in the candidate subframe set for transmitting the second information in the SI window, and is a positive integer.

In certain embodiments, there is a one-to-one correspondence between Y bits and K subframe subsets of X subframe subsets, wherein the K is a positive integer less than or equal to X.

In certain embodiments, $Y=\text{ceiling}(\log_2 X)$, and the K subframe subsets are the subframe subsets whose indexes are from 0 to K-1 in the X subframe subsets.

In certain embodiments, when the MTC system is the FDD system, the candidate subframe set includes the subframe #4 and the subframe #5 in all the radio frames, and a scheduling period of the first information is 8 radio frames, the first information is transmitted repeatedly in the scheduling period for 4 times; correspondingly, determining the subframe set for transmitting the first information according to the PCID includes that:

a frame type of the radio frame for transmitting the first information is determined according to the PCID; and it is determined, according to the PCID and the radio frame index, that the subframe for transmitting the first information in the radio frame of the frame type is the subframe #4 or the subframe #5;

or, the first information is transmitted repeatedly in the scheduling period for 8 times; correspondingly, determining the subframe set for transmitting the first information according to the PCID includes that:

it is determined, according to the PCID and the radio frame index, that the subframe for transmitting the first information in the radio frame is the subframe #4 or the subframe #5.

In certain embodiments, when the MTC system is the TDD system, the candidate subframe set includes the subframe #0 and the subframe #5 in all the radio frames, and the scheduling period of the first information is 8 radio frames, the first information is transmitted repeatedly in the scheduling period for 4 times; correspondingly, determining the subframe set for transmitting the first information according to the PCID includes that:

the frame type of the radio frame for transmitting the first information is determined according to the PCID; and it is determined, according to the PCID and the radio frame index, that the subframe for transmitting the first information in the radio frame of the frame type is the subframe #0 or the subframe #5;

or, the first information is transmitted repeatedly in the scheduling period for 8 times; correspondingly, determining the subframe set for transmitting the first information according to the PCID includes that:

it is determined, according to the PCID and the radio frame index, that the subframe for transmitting the first information in the radio frame is the subframe #0 or the subframe #5.

According to another embodiment of the present disclosure, a device for information transmission in an MTC system is also provided. The device includes a determining module and a processing module.

The determining module is configured to determine the subframe set and the narrowband for transmitting the first information according to the PCID, and The processing module is configured to send or receive the first information on the subframe set and the narrowband.

In certain embodiments, the determining module is further configured to, before determining the subframe set and the narrowband for transmitting the first information according to the PCID, acquire the candidate subframe set and the candidate narrowband set for transmitting the first information, wherein the candidate subframe set includes the subframe set, and the candidate narrowband set includes the narrowband.

In certain embodiments, the determining module is configured to acquire the candidate narrowband set for transmitting the first information by implementing the following process: all the narrowbands in the preset system bandwidth range are acquired; or other narrowbands, except the narrowbands for the PBCH transmission, in the preset system bandwidth range are acquired; or W narrowbands of all the narrowbands in the preset system bandwidth range are acquired;

the W is a positive integer less than or equal to $N_{NB}$, and the $N_{NB}$ is the number of narrowbands in the system bandwidth range.

In certain embodiments, the W is an even number; the W narrowbands include W/2 narrowbands close to the upper sideband and W/2 narrowbands close to the lower sideband.

In certain embodiments, the determining module is further configured to, before acquiring the candidate narrowband set for transmitting the first information, determine that there is no PBCH transmission in the subframe for transmitting the first information, and set that the candidate narrow set for transmitting the first information includes all the narrowbands in the system bandwidth range; or, the determining module is further configured to determine that there is the PBCH transmission in the subframe for transmitting the first information, and set that the candidate narrow set for transmitting the first information includes other narrowbands, except the narrowbands for the PBCH transmission, in the system bandwidth range.

In certain embodiments, the MTC system is the FDD system; the determining module is configured to acquire the candidate subframe set for transmitting the first information by implementing the following process: the subframe #0, the subframe #4, the subframe #5 and the subframe #9 in the radio frame are acquired; it is determined that at least one of the subframe #0, the subframe #4, the subframe #5 and the subframe #9 is the candidate subframe; and it is determined that the subframe set composed of the candidate subframes in all the radio frames is the candidate subframe set for transmitting the first information;

or, the MTC system is the TD system; the determining module is configured to acquire the candidate subframe set for transmitting the first information by implementing the following process: the subframe #0 and the subframe #5 in the radio frame are acquired; it is determined that at least one of the subframe #0 and the subframe #5 is the candidate subframe; and it is determined that the subframe set composed of the candidate subframes in all the radio frames is the candidate subframe set for transmitting the first information.

In certain embodiments, the determining module is further configured to determine the candidate subframe according to at least one of TBS, system bandwidth, functions supported by a cell, the number of narrowbands included in the candidate narrowband set and subframes for PBCH transmission.

In certain embodiments, the determining module is configured to determine the subframe set and the narrowband for transmitting the first information according to the PCID by implementing the following process: the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information; wherein, the N is a positive integer, and the n is an integer;

the number M of the narrowbands included in the candidate narrowband set is acquired; the belonging group of the PCID is determined according to the second rule; the group number m of the belonging group is acquired; and the narrowband whose number is the same as the group number m is determined as the narrowband for transmitting the first information; wherein, the M is a positive integer, and the m is an integer.

In certain embodiments, each subframe subset includes B subframes in A radio frames, wherein the A is a positive integer; for the FDD system, the B is a positive integer greater than 1 and less than 4, or the B is equal to 1, or the B is equal to 4; for the TDD system, the B is 1 or 2.

In certain embodiments, the determining module is configured to determine the belonging group of the PCID according to the first rule by implementing the following process: the belonging group of the PCID is determined according to the formula: n=mod(PCID,N).

and, the belonging group of the PCID is determined according to the formula: m=mod($\lfloor$PCID/N$\rfloor$,M);

wherein, the n and the m are the group numbers of the belonging groups of the PCID, the N is the number of subframe subsets included in the candidate subframe set, and the M is the number of narrowbands included in the candidate narrowband set.

In certain embodiments, the determining module is configured to determine the belonging group of the PCID according to the first rule by implementing the following process: the belonging group of the PCID is determined according to the formula: n=mod($\lfloor$PCID/M$\rfloor$,N).

and, the belonging group of the PCID is determined according to the formula: m=mod(PCID,M);

wherein, the n and the m are the group numbers of the belonging groups of the PCID, the N is the number of subframe subsets included in the candidate subframe set, and the M is the number of narrowbands included in the candidate narrowband set.

In certain embodiments, when the narrowband frequency hopping of the first information is enabled, the determining module is configured to determine the narrowband for transmitting the first information according to the PCID by implementing the following process: the narrowband for transmitting the first information is determined according to the PCID, and the subframe index and/or the radio frame index for transmitting the first information.

In certain embodiments, in the first case, in the same subframe set, the gap between two narrowbands for transmitting the first information of two different cells is fixed; in the second case, in the same subframe set, the gap between two narrowbands for transmitting the first information of two different cells is not fixed; the first case is different from the second case.

In certain embodiments, in the first case, the determining module is configured to determine the narrowband for transmitting the first information according to the PCID, and the subframe index and/or the radio frame index for transmitting the first information by implementing the following process: the narrowband for transmitting the first information is determined according to the formula: m(Idx)=mod($\lfloor$PCID/N$\rfloor$+Idx, M) or m(Idx)=mod(PCID+Idx,M);

the Idx represents the subframe index or the radio frame index for transmitting the first information, the m(Idx) represents the index of the narrowband for transmitting the first information on the subframe or the radio frame whose index is the Idx, the N is the number of subframe subsets included in the candidate subframe set for transmitting the first information, and the M is the number of narrowbands included in the candidate narrowband set for transmitting the first information.

In certain embodiments, in the second case, the determining module is configured to determine the narrowband for transmitting the first information according to the PCID, and the subframe index and/or the radio frame index for transmitting the first information by implementing the following process: the random collating sequence S corresponding to the PCID is acquired, and the narrowband for transmitting the first information is determined according to the formula m(Idx)=S{mod(Idx,M)}; the random collating sequence S includes M integers from 0 to (M−1);

the m(Idx) represents the index of the narrowband for transmitting the first information on the subframe or the radio frame whose index is the Idx, and the M is the number of narrowbands included in the candidate narrowband set for transmitting the first information.

In certain embodiments, the device further includes an indicating module, which is configured to use, through the first information, the independent configuration signaling to indicate the actual transmission subframe of the second information in the corresponding SI window.

In certain embodiments, the first information is the SIB1, the second information is other SIBx except the SIB1, wherein the x is a positive integer not equal to 1.

In certain embodiments, the indicating module is further configured to, before using, through the first information, the independent configuration signaling to indicate the actual transmission subframe of the second information in the corresponding SI window, divide the candidate subframe set for transmitting the second information in the SI window into X subframe subsets in the first way or the second way, and determine that the actual transmission subframe of the second information in the corresponding SI window is at least one of the X subframe subsets; wherein, the first way is different from the second way, and the X is a positive integer.

In certain embodiments, the first way is the discontinuous subframe allocation way; the indicating module is configured to divide the candidate subframe set for transmitting the second information in the SI window into X subframe subsets in the first way by implementing the following process: every X continuous subframes in the candidate subframe set are divided into a group, and the subframes in each group are numbered; the subframe subset whose number is x is composed of the subframes whose number is x in each subframe group; wherein, the X is a positive integer, and the x is an integer less than or equal to X−1.

In certain embodiments, the second way is the continuous subframe allocation way; the indicating module is configured to divide the candidate subframe set for transmitting the second information in the SI window into X subframe subsets in the second way by implementing the following process: every ceiling(P/X) continuous subframes in the candidate subframe set are divided into a group; the subframe subset whose number is x is the divided subframe group whose number is x; wherein, the P represents the number of subframes included in the candidate subframe set, the X is a positive integer, and the x is an integer less than or equal to X−1.

In certain embodiments, the indicating module is configured to determine that the actual transmission subframe of the second information in the corresponding SI window is at least one of the X subframe subsets by implementing the following way: it is determined that the actual transmission subframe of the second information in the corresponding SI window is at least one of the X subframe subsets according to at least one of the current coverage enhancement level, covering target, and TBS of the second information.

In certain embodiments, when the MTC system is the FDD system, the candidate subframe set includes the subframe #4 and the subframe #5 in all the radio frames, and the scheduling period of the first information is 8 radio frames, the first information is transmitted repeatedly in the scheduling period for 4 times; correspondingly, the determining module is configured to determine the subframe set for transmitting the first information according to the PCID by implementing the following way:

the frame type of the radio frame for transmitting the first information is determined according to the PCID; and it is determined, according to the PCID and the radio frame index, that the subframe for transmitting the first information in the radio frame of the frame type is the subframe #4 or the subframe #5;

or, the first information is transmitted repeatedly in the scheduling period for 8 times; correspondingly, the determining module is configured to determine the subframe set for transmitting the first information according to the PCID by implementing the following way:

it is determined, according to the PCID and the radio frame index, that the subframe for transmitting the first information in the radio frame is the subframe #4 or the subframe #5.

In certain embodiments, when the MTC system is the TDD system, the candidate subframe set includes the subframe #0 and the subframe #5 in all the radio frames, and the scheduling period of the first information is 8 radio frames, the first information is transmitted repeatedly in the scheduling period for 4 times; correspondingly, the determining module is configured to determine the subframe set for transmitting the first information according to the PCID by implementing the following way:

the frame type of the radio frame for transmitting the first information is determined according to the PCID; and it is determined, according to the PCID and the radio frame index, that the subframe for transmitting the first information in the radio frame of the frame type is the subframe #0 or the subframe #5;

or, the first information is transmitted repeatedly in the scheduling period for 8 times; correspondingly, the determining module is configured to determine the subframe set for transmitting the first information according to the PCID by implementing the following way:

it is determined, according to the PCID and the radio frame index, that the subframe for transmitting the first information in the radio frame is the subframe #0 or the subframe #5.

According to the methods and devices for information transmission in an MTC system which are provided by the above embodiment, the subframe set and the narrowband for transmitting the first information are determined according to the PCID; and the first information is sent or received on the subframe set and the narrowband. As such, when the first information is the system information, the interferences caused by the system information transmission between adjacent cells can be effectively prevented and reduced, thereby improving user experience.

Other aspects can be understood after the accompanying drawings and detailed descriptions are read and understood.

DETAILED DESCRIPTION OF THE EMBODIMENTS

In embodiments of the disclosure, a network side determines a corresponding subframe set and narrowband for transmitting first information according to a PCID, and sends the first information on the corresponding subframe set and narrowband; and a terminal side determines the corresponding subframe set and narrowband for transmitting the first information according to the PCID, and receives the first information on the corresponding subframe set and narrowband.

Embodiment One

Figure 1:
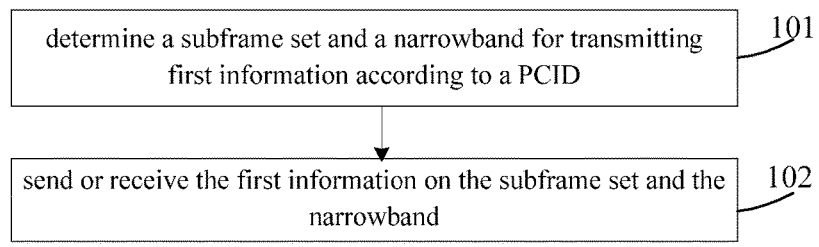
FIG. 1 is a flowchart of a method for information transmission in an MTC system according to an embodiment of the disclosure.

FIG. 1 is a flowchart of a method for information transmission in an MTC system according to an embodiment of the disclosure. The method can be applied to a network side as well as a terminal side. As shown in FIG. 1, the method for information transmission in the present embodiment includes the following steps.

In S101, a subframe set and a narrowband for transmitting first information are determined according to a PCID.

Before the step, the method further includes that: a candidate subframe set and a candidate narrowband set for transmitting the first information are acquired, wherein the candidate subframe set includes the subframe set, and the candidate narrowband set includes the narrowband.

Here, the first information can be SIB1 information.

Acquiring the candidate subframe set and the candidate narrowband set for transmitting the first information includes that:

the candidate subframe set and the candidate narrowband set for transmitting the first information which are preset are acquired; for the terminal side, except the above way, the candidate subframe set and the candidate narrowband set for transmitting the first information can also be acquired through MIB signaling.

The candidate narrowband set for transmitting the first information includes: all narrowbands defined in a system bandwidth range, or other narrowbands, except the narrowband for PBCH transmission, in the system bandwidth range, or W narrowbands in all the narrowbands defined in the system bandwidth range; the system is the MTC system;

wherein, the W is a positive integer less than or equal to $N_{NB}$, and the $N_{NB}$ is the number of narrowbands defined in the system bandwidth range; alternatively, the W is an even number, and then, the W narrowbands may include W/2 narrowbands close to an upper sideband and W/2 narrowbands close to a lower sideband; for example, for a system bandwidth of 3 MHz or 5 MHz, the W can be preset as 2; for the system bandwidth greater than 5 MHz, the W can be a value greater than or equal to 4.

Here, the definable numbers of narrowbands corresponding to different system bandwidths are different, so the candidate narrowband sets that different system bandwidths include are different too. Table 1 shows the definable numbers of narrowbands corresponding to different system bandwidths; each narrowband includes 6 Resource Blocks (RB), and $N_{RB}$ represents the number of RBs that the system bandwidth includes.

TABLE 1

| | System bandwidth [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |
| The maximum number of narrowbands $N_{NB}$ | 1 | 2 | 4 | 8 | 12 | 16 |

When the system bandwidth is greater than or equal to 5 MHz, there is never an overlap between the candidate narrowband set for transmitting the SIB1 and a PBCH resource area (namely 72 subcarriers at the center of the system bandwidth). For an MTC application, the priority of a scenario with a comparatively small system bandwidth (e.g. 1.4 MHz and 3 MHz) may not be high. If the scenario with a small system bandwidth is not considered, it is completely possible to limit that there is never an overlap between the candidate narrowband set for transmitting the SIB1 and the PBCH resource area, and then, there is no conflict even if the SIB1 and the PBCH are transmitted on the same subframe, consequently PBCH repetition will not influence the transmission of the SIB1.

Alternatively, when the candidate narrowband set for transmitting the first information is set, if there is no PBCH transmission in the subframe for transmitting the first information, it is possible to set the candidate narrowband set for transmitting the first information as including all the narrowbands defined in the system bandwidth range; if there is the PBCH transmission in the subframe for transmitting the first information, it is possible to set the candidate narrowband set for transmitting the first information as including all the other narrowbands, except the narrowband for the PBCH transmission, defined in the system bandwidth range; that is, depending on whether there is the PBCH transmission in the subframe, for different subframes, the candidate narrowband sets corresponding to the first information can be different.

When the candidate subframe set for transmitting the first information is set, it is possible to determine the candidate subframe set for transmitting the first information according to at least one parameter of TBS, system bandwidth, functions supported by a cell, the number of narrowbands included in the candidate narrowband set and subframes for the PBCH transmission, wherein the functions supported by a cell include an MTC coverage enhancement function.

When the first information is the SIB1, because a terminal cannot acquire Multicast and Broadcast Single Frequency Network (MBSFN) subframe configuration information of the current cell and special subframe configuration information about a TDD system, an SIB1 message can only be transmitted on a downlink subframe which will never be configured as an MBSFN subframe and a TDD special subframe. For an FDD system, a downlink subframe set which will never be configured as the MBSFN subframe includes subframe #0, subframe #4, subframe #5 and subframe #9 in all radio frames; correspondingly, the candidate subframe set is at least one of the subframe #0, the subframe #4, the subframe #5 and the subframe #9 in all the radio frames, that is, at least one of the subframe #0, the subframe #4, the subframe #5 and the subframe #9 is the candidate subframe, and the subframe set composed of the candidate subframes in all the radio frames is the candidate subframe set for transmitting the first information. For the TDD system, the downlink subframe set which will never be configured as the MBSFN subframe and the TDD special subframe includes the subframe #0 and the subframe #5 in all the radio frames; correspondingly, the candidate subframe set is at least one of the subframe #0 and the subframe #5 in all the radio frames, that is, at least one of the subframe #0 and the subframe #5 is the candidate subframe, and the subframe set composed of the candidate subframes in all the radio frames is the candidate subframe set for transmitting the first information.

When the same time-frequency resource is allocated, in order to achieve the same coverage level or coverage range as a comparatively small TBS, a comparatively big TBS usually needs more repetitions, so the candidate subframe set for transmitting the SIB1 corresponding to the comparatively big TBS usually includes more subframes. Taking the FDD system as an example, if the SIB1 message supports two TBS sets, each TBS set includes at least one certain TBS value, and the maximum TBS value in a second TBS set is far more than the maximum TBS value included in a first TBS set, and then, the candidate subframe set for transmitting the SIB1 corresponding to the first TBS set can be the subframe #4 and the subframe #5 in all the radio frames, and the candidate subframe set for transmitting the SIB1 corresponding to the second TBS set can be the subframe #0, the subframe #4, the subframe #5 and the subframe #9 in all the radio frames. If the current cell supports the MTC coverage enhancement function, in order to ensure that a coverage enhancement terminal can receive the SIB1 message accurately and timely, the candidate subframe set for transmitting the SIB1 includes more subframes; this is because more repetitions of the SIB1 message are necessary for realizing coverage enhancement or a wider coverage range.

Moreover, for a small system bandwidth (e.g. 3 MHz), taking the FDD system as an example, depending on a system configuration, the subframe transmitting the PBCH currently can be the subframe #0, or the subframe #0 and the subframe #9; given that there may be an overlap between all the narrowbands of the subframe #0, or the subframe #0 and the subframe #9 and a PBCH resource (the 72 subcarriers at the center of the system bandwidth) carrying MIB information, and compared with the SIB1 message, the priority of MIB transmission is higher, so in this case, the subframe #0, or the subframe #0 and the subframe #9 can no longer be used for transmitting the SIB1 message, and the final candidate subframe set for transmitting the SIB1 message can only be limited to the scope of subframe #4, the subframe #5 and the subframe #9 of all the radio frames, or the subframe #4 and the subframe #5 of all the radio frames. Taking the TDD system for an example, depending on the system configuration, the subframe transmitting the PBCH currently can be the subframe #0, or the subframe #0 and the subframe #5; if there is an overlap between all the narrowbands of only the subframe #0 and the PBCH resource carrying the MIB information, then the subframe #0 can no longer be used for transmitting the SIB1 message, and the final candidate subframe set for transmitting the SIB1 message can only be limited to the scope of the subframe #5 of all the radio frames; however, if there is an overlap between all the narrowbands of the subframe #0 and the subframe #5 and the PBCH resource carrying the MIB information, then, in order to ensure the normal transmission of the SIB1 message, it is possible to still use the subframe #0 and the subframe #5 to transmit the SIB1 message, and the final candidate subframe set for transmitting the SIB1 message is still limited to the scope of the subframe #0 and the subframe #5 of all the radio frames, but frequency domain resources for transmitting the SIB1 in the scope of subframes can only be a part of resources in the narrowbands, namely remaining resources except the resources which have been allocated for the PBCH transmission in the narrowbands.

For a comparatively large system bandwidth (e.g. 20 MHz), if the candidate narrowband set for transmitting the SIB1 includes most of the narrowbands (e.g. more than 10) defined in the system bandwidth range, and then, given enough narrowbands for transmitting the SIB1, even if the candidate subframe set for transmitting the SIB1 includes the only subframe in all the radio frames, interferences caused by SIB1 message transmission between adjacent cells can be prevented by making the adjacent cells use different narrowbands; if the candidate narrowband set for transmitting the SIB1 includes only a few narrowbands (e.g. less than 4) defined in the system bandwidth range, and then, given fewer narrowbands for transmitting the SIB1, the interferences caused by the SIB1 message transmission between the adjacent cells cannot be prevented completely by making the adjacent cells use different narrowbands; so, in order to increase flexibility and freedom of interference coordination between the adjacent cells, preferably the candidate narrowband set for transmitting the SIB1 includes at least two subframes in all the radio frames.

When the system bandwidth is less than 5 MHz, for the FDD system, there is never an overlap between the candidate subframe set for transmitting the SIB1 and the subframe set (namely the subframe #0, or the subframe #0 and the subframe #9 in all the radio frames) for transmitting the PBCH. For the scenario with a comparatively small system bandwidth (e.g. 1.4 MHz and 3 MHz), because there is a small number of definable narrowbands, no matter how the narrowbands are divided, there is always an overlap between any narrowband and the PBCH resource area. So, in order to avoid the PBCH from influencing the SIB1 message transmission, it is optional to prevent through resources on the subframe set (time domain) but not the resources on the narrowband (frequency domain).

Alternatively, determining the subframe set and the narrowband for transmitting the first information according to the PCID includes that:
  the candidate subframe set for transmitting the first information is divided into N subframe subsets; a belonging group of the PCID is determined according to a first rule; a group number n of the belonging group is acquired; and a subframe subset whose number is the same as the group number n is determined as the subframe set for transmitting the first information; wherein, the N is a positive integer, and the n is an integer;
  the number M of the narrowbands included in the candidate narrowband set is acquired; the belonging group of the PCID is determined according to a second rule; a group number m of the belonging group is acquired; and a narrowband whose number is the same as the group number m is determined as the narrowband for transmitting the first information; wherein, the M is a positive integer, and the m is an integer.

Here, the candidate subframe set for transmitting the first information is divided into N subframe subsets, so that each subframe subset includes B subframes in A radio frames, wherein both the A and the B are positive integers. Alternatively, in the FDD system, $1 \leq B \leq 4$, and $B \in N^+$; and in the TDD system, the B is 1 or 2. For example, in the FDD system, if the candidate subframe set for transmitting the first information includes the subframe #5 in all the radio frames, the N can be equal to 2, and then, the subframe set whose number is 0 includes the subframe #5 in all the radio frames whose numbers are even numbers, and the subframe set whose number is 1 includes the subframe #5 in all the radio frames whose numbers are odd numbers.

Determining the belonging group of the PCID according to the first rule includes that: the belonging group of the PCID is determined according to a formula: n=mod(PCID, N);
  correspondingly, determining the belonging group of the PCID according to the second rule includes that: the belonging group of the PCID is determined according to a formula: m=mod($\lfloor$PCID/N$\rfloor$,M).
  or, determining the belonging group of the PCID according to the first rule includes that: the belonging group of the PCID is determined according to a formula: n=mod($\lfloor$PCID/M$\rfloor$,N).
  correspondingly, determining the belonging group of the PCID according to the second rule includes that: the belonging group of the PCID is determined according to a formula: m=mod(PCID,M).
  wherein, the n and the m are the group numbers of the belonging groups of the PCID determined according to the first rule and the second rule; alternatively, values of the n and the m are counted from 0.

Alternatively, when narrowband frequency hopping of the first information is enabled, determining the narrowband for transmitting the first information according to the PCID includes that:
  the narrowband for transmitting the first information is determined according to the PCID, and a subframe index and/or a radio frame index for transmitting the first information. In a first case, in the same subframe set, a gap between two narrowbands for transmitting the first information of two different cells is fixed; and in a second case, in the same subframe set, the gap between two narrowbands for transmitting the first information of two different cells is not fixed.

Herein, in the first case, there is cellular planning, that is, the PCID of the current cell needs to be determined according to the PCID of other adjacent cells; in the second case, there is no cellular planning, that is, the PCID of the current cell has nothing to do with the adjacent cells.

The subframe index or the radio frame index can be physical subframe index or radio frame index, or logical subframe index or radio frame index in a frequency hopping period range.

The gap between two narrowbands for transmitting the first information of two different cells is fixed, that is, the two different cells for transmitting the first information use the same frequency hopping pattern; correspondingly, the gap between two narrowbands for transmitting the first information of two different cells is not fixed, that is, the two different cells for transmitting the first information use different frequency hopping patterns.

Alternatively, in the first case, determining the narrowband for transmitting the first information according to the PCID, and the subframe index and/or the radio frame index for transmitting the first information includes that:
  the narrowband for transmitting the first information is determined according to a formula: m(Idx)=mod($\lfloor$PCID/N$\rfloor$+Idx,M) or m(Idx)=mod(PCID+Idx,M);
  wherein, the Idx represents the subframe index or the radio frame index for transmitting the first information, the m(Idx) represents an index of the narrowband for transmitting the first information on the subframe or the radio frame whose index is the Idx, the N is the number of subframe subsets included in the candidate subframe set for transmitting the first information, and the M is the number of narrowbands included in the candidate narrowband set for transmitting the first information.

In the second case, determining the narrowband for transmitting the first information according to the PCID, and the subframe index and/or the radio frame index for transmitting the first information includes that:
  a random collating sequence S corresponding to the PCID is acquired, and the narrowband for transmitting the first information is determined according to a formula m(Idx)=S{mod(Idx,M)}; the random collating sequence S includes M integers from 0 to (M−1);
  wherein, the m(Idx) represents the index of the narrowband for transmitting the first information on the subframe or the radio frame whose index is the Idx, the M is the number of narrowbands included in the candidate narrowband set for transmitting the first information, and the S{F} represents the Fth element in the sequence S; the F is an integer greater than 0 and less than M−1, or the F is equal to 0, or the F is equal to M−1.

Acquiring the random collating sequence S corresponding to the PCID includes that:
  a pseudorandom sequence c is acquired according to the PCID; the pseudorandom sequence c is intercepted in order, and every continuous D bits are intercepted as a bit set; if the bit set intercepted currently is the same as one of the bit sets intercepted before, the current bit set is abandoned until M different bit sets whose length is D bits, and the M bit sets are numbered from 0 to (M−1); then, the bit sets numbered from 0 to (M−1) are reordered according to the values, and a number sequence corresponding to the reordered bit sets is the random collating sequence S corresponding to the PCID.

Herein, acquiring the pseudorandom sequence c according to the PCID can be that a related pseudorandom sequence generating way is used to acquire the corresponding pseudorandom sequence according to the PCID, alternatively:

$c(j)=(x_1(j+N_C)+x_2(j+N_C))\bmod 2;$ $x_1(j+31)=(x_1(j+3)+x_1(j))\bmod 2;$ and $x_2(j+31)=(x_2(j+3)+x_2(j+2)+x_2(j+1)+x_2(j))\bmod 2;$ wherein, the c(j) is the jth element in the pseudorandom sequence c, and the j is an integer greater than or equal to 0.

The first pseudorandom sequence and the second pseudorandom sequence are initialized according to the following equations:
  $x_1(0)=1$, $x_1(j)=0$, $j=1, 2, \ldots, 30$, and $c_{init}=\Sigma_{i=0}^{30} x_2(i)\cdot 2^i=$PCID; wherein, the $N_C$ is a preset constant; alternatively, the $N_C$ is 1600.

Reordering the bit sets numbered from 0 to (M−1) according to the values includes that:
  the bit sets numbered from 0 to (M−1) are reordered in descending order of the values; or the bit sets numbered from 0 to (M−1) are reordered in ascending order of the values.

Alternatively, the method further includes that:
  independent configuration signaling is used, through the first information, to indicate an actual transmission subframe of second information in a corresponding SI window, namely a transmission window; that is, there is a one-to-one correspondence between each piece of second information and the corresponding configuration signaling; in an embodiment, when the first information is the SIB1 information, the second information can be SIB information except the SIB1 information, namely SIBx, wherein the x is a positive integer not equal to 1.

Here, the number of repetitions of the second information depends on the size of the configured SI window and the number of actual transmission subframes in the SI window, and the size of the actual transmission subframe and/or the scheduling period of the second information in the SI window can be adjusted by using the independent configuration signaling, so as to implement the configuration of the number of repetitions required by the second information.

Alternatively, before the independent configuration signaling is used, through the first information, to indicate the actual transmission subframe of the second information in the corresponding SI window, the method further includes that:
  a candidate subframe set for transmitting the second information in the SI window is divided into X subframe subsets in a first way or a second way, and it is determined that the actual transmission subframe of the second information in the corresponding SI window is at least one of the X subframe subsets; wherein, the first way is different from the second way, and the X is a positive integer.

When the first information is the SIB1 information, and the second information is the SIBx, the candidate subframe set for transmitting the second information includes: other downlink subframes except all the MBSFN downlink subframes, or other downlink subframes except all the MBSFN downlink subframes for transmitting a Multimedia Broadcast Multicast Service (MBMS), or other downlink subframes except all the MBSFN downlink subframes and all downlink subframes for transmitting the SIB1, or other downlink subframes except all the MBSFN downlink subframes for transmitting the MBMS and all the downlink subframes for transmitting the SIB1. Herein, when the candidate subframe set for transmitting the second information includes other downlink subframes except all the MBSFN downlink subframes, or other downlink subframes except all the MBSFN downlink subframes for transmitting the MBMS, if there is a conflict between the transmission of the SIBx and the transmission of the SIB1, the transmission of the SIBx is given up.

The first way can be a discontinuous subframe allocation way; correspondingly, dividing the candidate subframe set for transmitting the second information in the SI window into X subframe subsets in the first way includes that:

every X continuous subframes in the candidate subframe set are divided into a group, and the subframes in each group are numbered; the subframe subset whose number is x is composed of the subframes whose number is x in each subframe group, that is, the gap between adjacent subframes in any subframe subset is X−1; wherein, the x is an integer greater than 0 and less than X−1, or the x is equal to 0, or the x is equal to X−1. It is to be noted that if the number of remaining subframes, not allocated to the subframe group, in the candidate subframe set is less than X (that is, the number of the remaining subframes is not enough to be divided into a group), the number of subframes included in the final subframe group is less than X.

The second way can be a continuous subframe allocation way; correspondingly, dividing the candidate subframe set for transmitting the second information in the SI window into X subframe subsets in the second way includes that:

every ceiling(P/X) continuous subframes in the candidate subframe set are divided into a group; the subframe subset whose number is x is the divided subframe group whose number is x; wherein, the P represents the number of subframes included in the candidate subframe set, the ceiling represents an operation of rounding up to an integer, the x is an integer greater than 0 and less than X−1, or the x is equal to 0, or the x is equal to X−1. It is to be noted that if the number of remaining subframes, not allocated to the subframe group, in the candidate subframe set is less than ceiling(P/X) (that is, the number of the remaining subframes is not enough to be divided into a group), the number of subframes included in the final subframe group is less than ceiling (P/X).

The X is a preset constant, and can be set according to the size of the SI window or according to actual needs. For the terminal side, the value of the X can also be indicated through the first information. Generally, a bigger SI window corresponds to a larger value of the X.

The actual transmission subframe of the second information in the corresponding SI window depends on the current coverage enhancement level or covering target, or TBS of the second information. For example, when the second information is required to reach the maximum coverage, it is possible to configure that the subframe set for transmitting the second information is all the candidate subframes (namely X subframe subsets); when the second information is only required to satisfy normal coverage, it is possible to configure that the subframe set for transmitting the second information is only one of X subframe subsets.

Figure 2A:
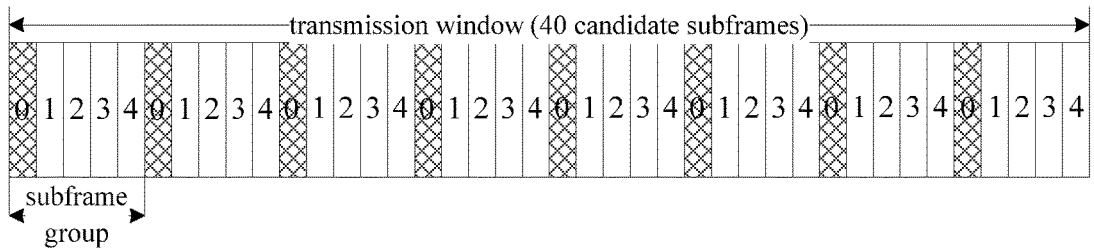
FIG. 2a and FIG. 2b are schematic diagrams of subframe sets for transmitting second information in transmission windows according to an embodiment of the disclosure.

For example, in the embodiment of the disclosure, if the candidate subframe set includes 40 subframes, the discontinuous subframe allocation way is adopted; if the X is equal to 5, that is, the candidate subframe sets are divided into 5 groups, every 5 continuous subframes in the candidate subframe set are divided into a group, and then, the subframe 0 in all the subframe groups is taken as the subframe subset 0; similarly, the subframe 1 in all the subframe groups is taken as the subframe subset 1, the subframe 2 in all the subframe groups is taken as the subframe subset 2, the subframe 3 in all the subframe groups is taken as the subframe subset 3, and the subframe 4 in all the subframe groups is taken as the subframe subset 4, wherein the gap between the adjacent subframes in any subframe subset is 4 (X−1 is equal to 4), as shown in FIG. 2a.

Figure 2B:
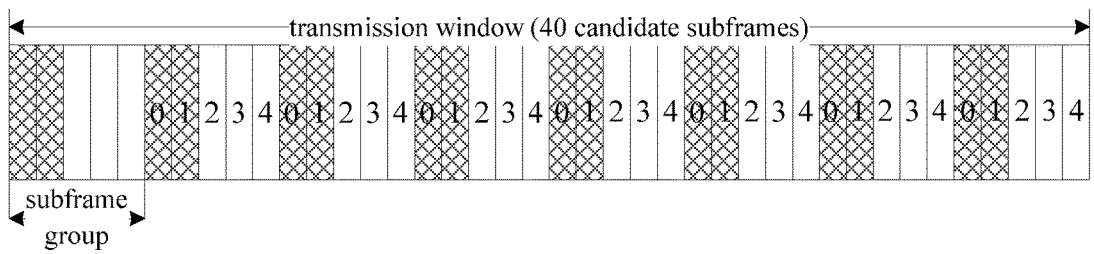

Depending on the current coverage enhancement level of the second information, it is configured that the subframe set actually transmitting the second information is the subframe subset 0 in the 5 subframe subsets, as shown in FIG. 2a; or, it is configured that the subframe set actually transmitting the second information is the subframe subset 0 and the subframe subset 1 in the 5 subframe subsets, as shown in FIG. 2b.

Herein, the independent configuration signaling indicates that the number of bits required by the actual transmission subframe of the second information in the corresponding SI window is Y; $Y=2^x-1$ or $Y=\text{ceiling}(\log_2 X)$, wherein the X is the number of subframe subsets included in the candidate subframe set for transmitting the second information in the SI window.

Herein, there is a one-to-one correspondence between Y bits and K subframe subsets of X subframe subsets, wherein the K is an integer greater than 1 and less than X, or the K is equal to 1, or the K is equal to X. When the Y is equal to ceiling(log 2X), the K subframe subsets of X subframe subsets are the subsets whose indexes are from 0 to K−1 in the X subframe subsets; that is, in order to save signaling overhead, it is needed to limit that the X subframe subsets always start from the subframe subset 0, and are continuous subframe subsets.

Because the X is equal to 5 in the present embodiment, in order to save the signaling overhead, it is determined, according to a formula $Y=\text{ceiling}(\log_2 X)=\text{ceiling}(\log_2 5)=3$, that the number of bits required by the actual transmission subframe of the second information in the SI window is 3, wherein the configuration of the actual transmission subframes corresponding to different values of the 3 bits can be shown in the following table.

TABLE 2

| | |
|---|---|
| 000 | The 0th subframe subset |
| 001 | The 0th subframe subset and the first subframe subset |
| 010 | The subframe sets from the 0th subframe subset to the second subframe subset |
| 011 | The subframe sets from the 0th subframe subset to the third subframe subset |
| 100 | The subframe sets from the 0th subframe subset to the fourth subframe subset |
| 101 | — |
| 110 | — |
| 111 | — |

In the present embodiment, it is configured that the subframe set actually transmitting the second information is the subframe subset 0 in the 5 subframe subsets, or is the subframe subset 0 and the subframe subset 1, so the values of the 3 bits are 000 or 001.

Alternatively, when the MTC system is the FDD system, the candidate subframe set includes the subframe #4 and the subframe #5 in all the radio frames, and a scheduling period of the first information is 8 radio frames, the first information is transmitted repeatedly in the scheduling period for 4 times; correspondingly, determining the subframe set for transmitting the first information according to the PCID includes that:

a frame type of the radio frame for transmitting the first information is determined according to the PCID; and it is determined, according to the PCID and the radio frame index, that the subframe for transmitting the first information in the radio frame of the frame type is the subframe #4 or the subframe #5; wherein, the frame type includes: an odd number radio frame and an even number radio frame.

Here, after it is determined that the radio frame for transmitting the first information is the odd number radio frame or the even number radio frame, it is possible to further determine, based on the odd number radio frame or the even number radio frame and according to the PCID and the radio frame index, that the subframe for transmitting the first information in the odd number radio frame or the even number radio frame is the subframe #4 or the subframe #5.

For example, if the PCID is an even number, the radio frame for transmitting the first information is the even number radio frame; if the PCID is an odd number, the radio frame for transmitting the first information is the odd number radio frame; and then, a pseudorandom sequence with a length of L1 is generated according to the PCID, and 8 (the size of the scheduling period) sequences with a length of L2 are intercepted in order, wherein the L1 is an integer greater than or equal to 8, the L2 is an integer greater than or equal to 1, and the L1 is greater than or equal to 8×L2. A one-to-one correspondence is made between the 8 sequences with a length of L2 and the 8 radio frames (with different radio frame indexes) in the scheduling period; if the sequence with a length of L2 corresponding to the current odd number or even number radio frame is converted into a value, and the value is an even number, the subframe transmitting the first information in the current odd number or even number radio frame is the subframe #4; if the sequence with a length of L2 corresponding to the current odd number or even number radio frame is converted into a value, and the value is an odd number, the subframe transmitting the first information in the current odd number or even number radio frame is the subframe #5;

or, the first information is transmitted repeatedly in the scheduling period for 8 times; correspondingly, determining the subframe set for transmitting the first information according to the PCID includes that:

it is determined, according to the PCID and the radio frame index, that the subframe for transmitting the first information in the radio frame is the subframe #4 or the subframe #5.

Here, the radio frames for transmitting the first information are all the radio frames, so there is no need to consider or determine the frame type of the radio frame for transmitting the first information in the process of determining the subframe set for transmitting the first information, that is, there is no need to consider whether the radio frame for transmitting the first information is the odd number radio frame or the even number radio frame, and it is possible to determine, according to the PCID and the radio frame index, that the subframe for transmitting the first information in the radio frame is the subframe #4 or the subframe #5.

For example, the pseudorandom sequence with a length of L1 is generated directly according to the PCID, and 8 (the size of the scheduling period) sequences with a length of L2 are intercepted in order, wherein the L1 is an integer greater than or equal to 8, the L2 is an integer greater than or equal to 1, and the L1 is greater than or equal to 8×L2. A one-to-one correspondence is made between the 8 sequences with a length of L2 and the 8 radio frames (with different radio frame indexes) in the scheduling period; if the sequence with a length of L2 corresponding to the current radio frame is converted into a value, and the value is an even number, the subframe transmitting the first information in the current radio frame is the subframe #4; if the sequence with a length of L2 corresponding to the current radio frame is converted into a value, and the value is an odd number, the subframe transmitting the first information in the current radio frame is the subframe #5.

Alternatively, when the MTC system is the TDD system, the candidate subframe set includes the subframe #0 and the subframe #5 in all the radio frames, and the scheduling period of the first information is 8 radio frames, the first information is transmitted repeatedly in the scheduling period for 4 times; correspondingly, determining the subframe set for transmitting the first information according to the PCID includes that:

the frame type of the radio frame for transmitting the first information is determined according to the PCID; and it is determined, according to the PCID and the radio frame index, that the subframe for transmitting the first information in the radio frame of the frame type is the subframe #0 or the subframe #5; wherein, the frame type includes: the odd number radio frame and the even number radio frame.

Here, after it is determined that the radio frame for transmitting the first information is the odd number radio frame or the even number radio frame, it is possible to further determine, based on the odd number radio frame or the even number radio frame and according to the PCID and the radio frame index, that the subframe for transmitting the first information in the odd number radio frame or the even number radio frame is the subframe #0 or the subframe #5.

For example, if the PCID is an even number, the radio frame for transmitting the first information is the even number radio frame; if the PCID is an odd number, the radio frame for transmitting the first information is the odd number radio frame; and then, the pseudorandom sequence with a length of L1 is generated according to the PCID, and 8 (the size of the scheduling period) sequences with a length of L2 are intercepted in order, wherein the L1 is an integer greater than or equal to 8, the L2 is an integer greater than or equal to 1, and the L1 is greater than or equal to 8×L2. A one-to-one correspondence is made between the 8 sequences with a length of L2 and the 8 radio frames (with different radio frame indexes) in the scheduling period; if the sequence with a length of L2 corresponding to the current odd number or even number radio frame is converted into a value, and the value is an even number, the subframe transmitting the first information in the current odd number or even number radio frame is the subframe #0; if the sequence with a length of L2 corresponding to the current odd number or even number radio frame is converted into a value, and the value is an odd number, the subframe transmitting the first information in the current odd number or even number radio frame is the subframe #5;

or, the first information is transmitted repeatedly in the scheduling period for 8 times; correspondingly, determining the subframe set for transmitting the first information according to the PCID includes that:

it is determined, according to the PCID and the radio frame index, that the subframe for transmitting the first information in the radio frame is the subframe #0 or the subframe #5.

Here, the radio frames for transmitting the first information are all the radio frames, so there is no need to consider or determine the frame type of the radio frame for transmitting the first information in the process of determining the subframe set for transmitting the first information, that is, there is no need to consider whether the radio frame for transmitting the first information is the odd number radio frame or the even number radio frame, and it is possible to determine, according to the PCID and the radio frame index, that the subframe for transmitting the first information in the radio frame is the subframe #0 or the subframe #5.

For example, the pseudorandom sequence with a length of L1 is generated directly according to the PCID, and 8 (the size of the scheduling period) sequences with a length of L2 are intercepted in order, wherein the L1 is an integer greater than or equal to 8, the L2 is an integer greater than or equal to 1, and the L1 is greater than or equal to 8×L2. A one-to-one correspondence is made between the 8 sequences with a length of L2 and the 8 radio frames (with different radio frame indexes) in the scheduling period; if the sequence with a length of L2 corresponding to the current radio frame is converted into a value, and the value is an even number, the subframe transmitting the first information on the current radio frame is the subframe #0; if the sequence with a length of L2 corresponding to the current radio frame is converted into a value, and the value is an odd number, the subframe transmitting the first information on the current radio frame is the subframe #5.

In S102, the first information is sent or received on the subframe set and the narrowband.

Here, because the method for information transmission can be applied to the network side as well as the terminal side, when the method is applied to the network side, S102 is that the network side sends the first information on the corresponding subframe set and narrowband; when the method is applied to the terminal side, S102 is that the terminal receives the first information on the corresponding subframe set and narrowband.

As such, when a predefined way is adopted to determine the subframe and narrowband for SIB1 transmission, adopting the above method for information transmission can achieve three effects as follows: first, the adjacent cells can use different narrowbands to transmit the SIB1 message, that is, the adjacent cells use different frequency domain resources to transmit the SIB1 message (frequency division); second, the adjacent cells can use different subframe sets to transmit the SIB1 message, that is, the adjacent cells use different time domain resources to transmit the SIB1 message (time division); third, the adjacent cells can use different narrowbands and subframe sets to transmit the SIB1 message, that is, the adjacent cells use different frequency domain and time domain resources to transmit the SIB1 message (time-frequency division); so, the interferences caused by system information transmission between the adjacent cells can be prevented and reduced effectively, thereby improving user experience.

Embodiment Two

The present embodiment provides a method for information transmission. The method can be applied to the network side as well as the terminal side. In the present embodiment, the MTC system is the FDD system, the system bandwidth is 3 MHz, there are 15 Physical Resource Block (PRB) resources included, and a system defines 2 narrowbands. As shown in FIG. 1, the method for information transmission in the present embodiment includes the following steps.

In S101, the subframe set and the narrowband for transmitting the first information are determined according to the PCID.

Before the step, the method further includes that: the preset candidate subframe set and the candidate narrowband set for transmitting the first information are acquired, wherein the candidate subframe set includes the subframe set, and the candidate narrowband set includes the narrowband.

In the present embodiment, the first information is the SIB1 information.

The candidate narrowband set for transmitting the first information is set as including all the narrowbands defined in the system bandwidth range; that is, the candidate narrowband set includes two narrowbands, which are the narrowband 0 and the narrowband 1 respectively.

In the present embodiment, the downlink subframe set which will never be configured as the MBSFN subframe in the system includes the subframe #0, the subframe #4, the subframe #5 and the subframe #9 in all the radio frames; however, the subframes for the PBCH transmission are the subframe #0 and the subframe #9; so, the candidate narrowband set for transmitting the first information is set as the subframe #4 and the subframe #5 in all the radio frames.

Alternatively, determining the subframe set and the narrowband for transmitting the first information according to the PCID includes that:

the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information; wherein, the N is a positive integer, and the n is an integer;

the number M of the narrowbands included in the candidate narrowband set is acquired; the belonging group of the PCID is determined according to the second rule; the group number m of the belonging group is acquired; and the narrowband whose number is the same as the group number m is determined as the narrowband for transmitting the first information; wherein, the M is a positive integer, and the m is an integer.

Here, the candidate subframe set for transmitting the first information is divided into N subframe subsets, so that each subframe subset includes B subframes in A radio frames, wherein both the A and the B are positive integers. In the present embodiment, the N is 2, the subframe subset whose number is 0 is composed of the subframe #4 in all the radio frames, and the subframe subset whose number is 1 is composed of the subframe #5 in all the radio frames.

Determining the belonging group of the PCID according to the first rule includes that: the belonging group of the PCID is determined according to the formula: n=mod(PCID, N), namely n=mod(PCID,N)=mod(0,2)=0;

correspondingly, determining the belonging group of the PCID according to the second rule includes that:
the belonging group of the PCID is determined according to the formula: m=mod($\lfloor$PCID/N$\rfloor$,M);

namely m=mod($\lfloor$PCID/N$\rfloor$,M)=mod($\lfloor$0/2$\rfloor$,2)=0;

that is, for the cell where the PCID is 0, the subframe subset and the narrowband
for transmitting the first information are the subframe subset whose number is 0 and the narrowband whose number is 0.

Figure 3:
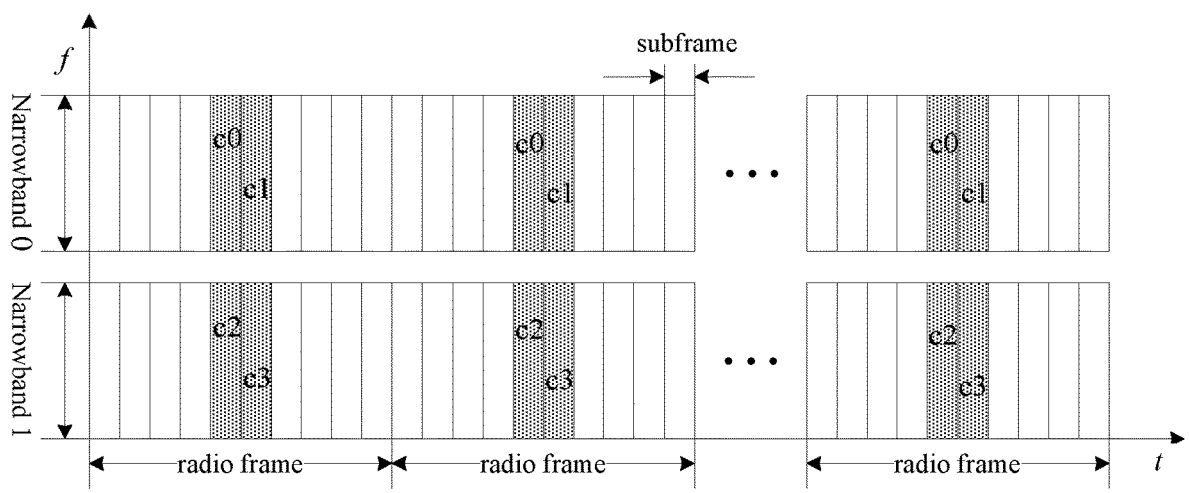
FIG. 3 is schematic diagram 1 of a subframe set and a narrowband for transmitting first information which are determined in an embodiment of the disclosure.

By using the same method, for the cell where the PCID is 1, the subframe subset and the narrowband for transmitting the first information are the subframe subset whose number is 1 and the narrowband whose number is 0;

for the cell where the PCID is 2, the subframe subset and the narrowband for transmitting the first information are the subframe subset whose number is 0 and the narrowband whose number is 1;

for the cell where the PCID is 3, the subframe subset and the narrowband for transmitting the first information are the subframe subset whose number is 1 and the narrowband whose number is 1. FIG. 3 is schematic diagram 1 of the subframe set and the narrowband for transmitting the first information which are determined in the present embodiment. In FIG. 3, c0, c1, c2 and c3 are the cell 0 (PCID=0), the cell 1 (PCID=1), the cell 2 (PCID=2) and the cell 3 (PCID=3). Table 3 shows a list of effects
achieved by using the determined subframe set and narrowband.

TABLE 3

| Cell | Cell 0 | 1 | 2 | 3 |
|---|---|---|---|---|
| 0 | — | Time division | Frequency division | Time-frequency division |
| 1 | Time division | — | Time-frequency division | Frequency division |
| 2 | Frequency division | Time-frequency division | — | Time division |
| 3 | Time-frequency division | Frequency division | Time division | — |

In S102, the first information is sent or received on the subframe set and the narrowband.

Here, because the method for information transmission can be applied to the network side as well as the terminal side, when the method is applied to the network side, correspondingly the network side sends the first information on the subframe set and narrowband; when the method is applied to the terminal side, correspondingly the terminal receives the first information on the subframe set and narrowband.

Embodiment Three

The present embodiment provides a method for information transmission. The method can be applied to the network side as well as the terminal side. In the present embodiment, the MTC system is the FDD system, the system bandwidth is 5 MHz, there are 25 PRB resources included, and the system defines 4 narrowbands. As shown in FIG. 1, the method for information transmission in the present embodiment includes the following steps.

In S101, the subframe set and the narrowband for transmitting the first information are determined according to the PCID.

Before the step, the method further includes that: the preset candidate subframe set and the candidate narrowband set for transmitting the first information are acquired, wherein the candidate subframe set includes the subframe set, and the candidate narrowband set includes the narrowband.

In the present embodiment, the first information is the SIB1 information.

Because the PBCH always occupies 72 subcarriers in the middle of the system bandwidth, no matter how the 4 narrowbands defined by the system are divided, there is always an overlap between one or two of the 4 narrowbands and the PBCH frequency domain resource, in order to avoid influencing the transmission of the PBCH, there are at least three candidate narrowbands actually transmitting the SIB1. In the present embodiment, the candidate narrowband set for transmitting the first information is set as including two narrowbands, which are respectively the narrowband close to the upper sideband and the narrowband close to the lower sideband. The two narrowbands are the narrowband 0 and the narrowband 1 respectively.

In the present embodiment, the downlink subframe set which will never be configured as the MBSFN subframe in the system includes the subframe #0, the subframe #4, the subframe #5 and the subframe #9 in all the radio frames, so the candidate subframe set for transmitting the first information is set as the subframe #0, the subframe #4, the subframe #5 and the subframe #9 in all the radio frames.

Alternatively, determining the subframe set and the narrowband for transmitting the first information according to the PCID includes that:

the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information; wherein, the N is a positive integer, and the n is an integer;

the number M of the narrowbands included in the candidate narrowband set is acquired; the belonging group of the PCID is determined according to the second rule; the group number m of the belonging group is acquired; and the narrowband whose number is the same as the group number m is determined as the narrowband for transmitting the first information; wherein, the M is a positive integer, and the m is an integer.

Here, the candidate subframe set for transmitting the first information is divided into N subframe subsets, so that each subframe subset includes B subframes in A radio frames, wherein both the A and the B are positive integers. In the present embodiment, the N is 4, the subframe subset whose number is 0 is composed of the subframe #0 in all the radio frames, the subframe subset whose number is 1 is composed of the subframe #4 in all the radio frames, the subframe subset whose number is 2 is composed of the subframe #5 in all the radio frames, and the subframe subset whose number is 3 is composed of the subframe #9 in all the radio frames.

Determining the belonging group of the PCID according to the first rule includes that:
the belonging group of the PCID is determined according to the formula: n=mod(⌊PCID/M⌋,N), namely n=mod(⌊PCID/M⌋,N)=mod(0,4)=0;

correspondingly, determining the belonging group of the PCID according to the second rule includes that:
the belonging group of the PCID is determined according to the formula: m=mod(PCID,M);

namely m=mod(PCID,M)=mod(0,2)=0;

that is, for the cell where the PCID is 0, the subframe subset and the narrowband for transmitting the first information are the subframe subset whose number is 0 and the narrowband whose number is 0.

Figure 4:
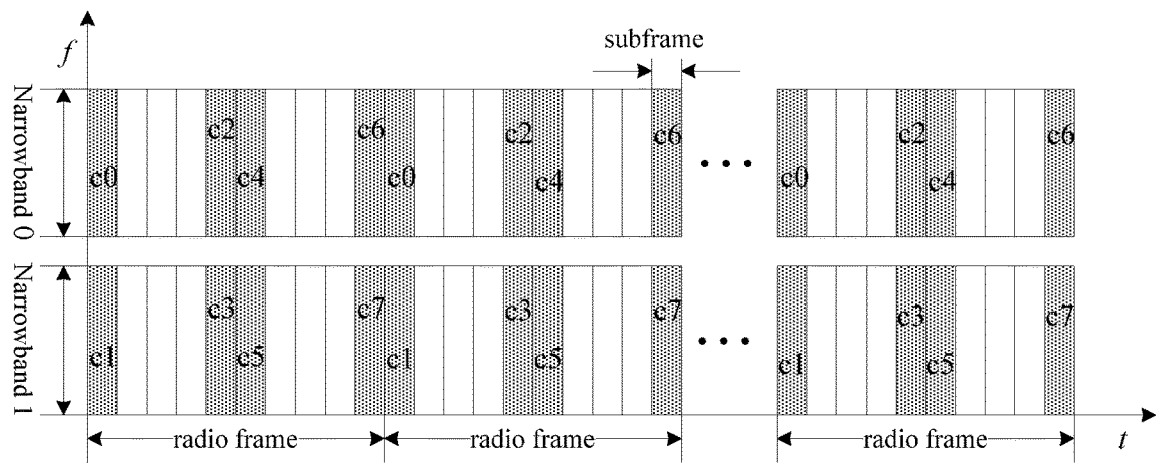
FIG. 4 is schematic diagram 2 of a subframe set and a narrowband for transmitting first information which are determined in an embodiment of the disclosure.

By using the same method, for the cell where the PCID is 1, the subframe subset and the narrowband for transmitting the first information are the subframe subset whose number is 0 and the narrowband whose number is 1;
for the cell where the PCID is 2, the subframe subset and the narrowband for transmitting the first information are the subframe subset whose number is 1 and the narrowband whose number is 0;
for the cell where the PCID is 3, the subframe subset and the narrowband for transmitting the first information are the subframe subset whose number is 1 and the narrowband whose number is 1;
for the cell where the PCID is 4, the subframe subset and the narrowband for transmitting the first information are the subframe subset whose number is 2 and the narrowband whose number is 0;
for the cell where the PCID is 5, the subframe subset and the narrowband for transmitting the first information are the subframe subset whose number is 2 and the narrowband whose number is 1;
for the cell where the PCID is 6, the subframe subset and the narrowband for transmitting the first information are the subframe subset whose number is 3 and the narrowband whose number is 0;
for the cell where the PCID is 7, the subframe subset and the narrowband for transmitting the first information are the subframe subset whose number is 3 and the narrowband whose number is 1. FIG. 4 is schematic diagram 2 of the subframe set and the narrowband for transmitting the first information which are determined in the present embodiment.

In S102, the first information is sent or received on the subframe set and the narrowband.

Embodiment Four

The present embodiment provides a method for information transmission. The method can be applied to the network side as well as the terminal side. In the present embodiment, the MTC system is the TDD system, the system bandwidth is 10 MHz, there are 50 PRB resources included, and the system defines 8 narrowbands. As shown in FIG. 1, the method for information transmission in the present embodiment includes the following steps.

In S101, the subframe set and the narrowband for transmitting the first information are determined according to the PCID.

Before the step, the method further includes that: the preset candidate subframe set and the candidate narrowband set for transmitting the first information are acquired, wherein the candidate subframe set includes the subframe set, and the candidate narrowband set includes the narrowband.

In the present embodiment, the first information is the SIB1 information.

Because the PBCH always occupies 72 subcarriers in the middle of the system bandwidth, no matter how the 8 narrowbands defined by the system are divided, there is always an overlap between one or two of the 8 narrowbands and the PBCH frequency domain resource, in order to avoid influencing the transmission of the PBCH, in the present embodiment, the candidate narrowband set for transmitting the first information is set as including 6 narrowbands, which are respectively the 3 narrowbands close to the upper sideband and the 3 narrowband close to the lower sideband. The 6 narrowbands are numbered from 0 to 5.

In the present embodiment, the downlink subframe set which will never be configured as the MBSFN subframe in the system includes the subframe #0 and the subframe #5 in all the radio frames. According to the current TBS and the number of narrowbands included in the candidate narrowband set (in the case of a larger number of candidate narrowbands, the number of candidate subframes can be reduced appropriately), the candidate subframe set for transmitting the first information is set as the subframe #5 in all the radio frames.

Alternatively, determining the subframe set and the narrowband for transmitting the first information according to the PCID includes that:
the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information; wherein, the N is a positive integer, and the n is an integer;
the number M of the narrowbands included in the candidate narrowband set is acquired; the belonging group of the PCID is determined according to the second rule; the group number m of the belonging group is acquired; and the narrowband whose number is the same as the group number m is determined as the narrowband for transmitting the first information; wherein, the M is a positive integer, and the m is an integer less than the M.

Here, the candidate subframe set for transmitting the first information is divided into N subframe subsets, so that each subframe subset includes B subframes in A radio frames, wherein both the A and the B are positive integers. In the present embodiment, the N is 1, the subframe subset whose number is 0 is composed of the subframe #5 in all the radio frames.

Determining the belonging group of the PCID according to the second rule includes that:
the belonging group of the PCID is determined according to the formula: m=mod(PCID,M),
namely m=mod(PCID,M)=mod(0, 6)=0;
that is, for the cell where the PCID is 0, the narrowband for transmitting the first information is the narrowband whose number is 0.

Figure 5:
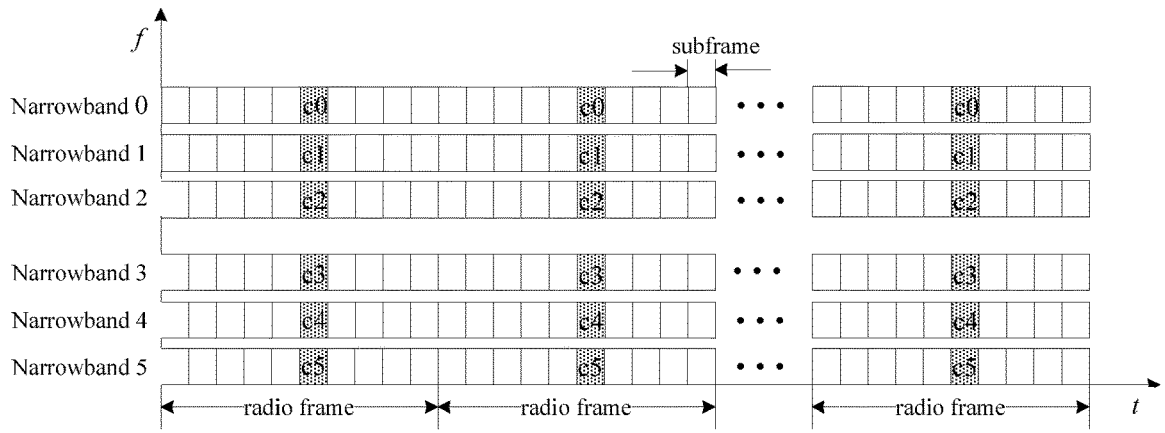
FIG. 5 is schematic diagram 3 of a subframe set and a narrowband for transmitting first information which are determined in an embodiment of the disclosure.

By using the same method, for the cell where the PCID is 1, the narrowband for transmitting the first information is the narrowband whose number is 1;
for the cell where the PCID is 2, the narrowband for transmitting the first information is the narrowband whose number is 2;

for the cell where the PCID is 3, the narrowband for transmitting the first information is the narrowband whose number is 3;

for the cell where the PCID is 4, the narrowband for transmitting the first information is the narrowband whose number is 4; and for the cell where the PCID is 5, the narrowband for transmitting the first information is the narrowband whose number is 5;

that is, in the present embodiment, it is feasible to avoid the interferences caused by first information transmission between the adjacent cells by only using a frequency division mode, that is, the adjacent cells occupy different narrowbands; the above 6 cells always transmit the first information on the same subframe subset or only subframe subset, namely the subframe #5 in all the radio frames. FIG. 5 is schematic diagram 3 of the subframe set and the narrowband for transmitting the first information which are determined in the present embodiment.

In S102, the first information is sent or received on the subframe set and the narrowband.

Embodiment Five

The present embodiment provides a method for information transmission. The method can be applied to the network side as well as the terminal side. As shown in FIG. 1, the method for information transmission in the present embodiment includes the following steps.

In S101, the subframe set and the narrowband for transmitting the first information are determined according to the PCID.

Before the step, the method further includes that: the preset candidate subframe set and the candidate narrowband set for transmitting the first information are acquired, wherein the candidate subframe set includes the subframe set, and the candidate narrowband set includes the narrowband.

In the present embodiment, the first information is the SIB1 information.

Acquiring the candidate subframe set and the candidate narrowband set for transmitting the first information includes that:

the preset candidate subframe set and the candidate narrowband set for transmitting the first information are acquired; for the terminal side, except the above way, the candidate subframe set and the candidate narrowband set for transmitting the first information can also be acquired through the MIB signaling.

In the present embodiment, the candidate narrowband set for transmitting the first information is set as including 4 narrowbands whose numbers are from 0 to 3; the candidate subframe set for transmitting the first information is set as including 2 subframe subsets whose numbers are 0 and 1. In the present embodiment, there are 4 cells which are adjacent to each other, and the numbers of the 4 cells are from 0 to 3.

Alternatively, determining the subframe set for transmitting the first information according to the PCID includes that:

the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information;

wherein, the N is a positive integer, and the n is an integer.

Herein, determining the belonging group of the PCID according to the first rule includes that: the belonging group of the PCID is determined according to the formula: n=mod($\lfloor$PCID/M$\rfloor$,N).

for the PCID is equal to 0, n=mod($\lfloor$PCID/M$\rfloor$,N)=mod($\lfloor$0/4$\rfloor$,2)=0.

that is, it is determined that the subframe set for the cell 0 to transmit the first information is the subframe subset whose number is 0;

by using the same method, it is possible to determine that all the subframe sets for the cell 1, the cell 2 and the cell 3 to transmit the first information are the subframe subset whose number is 0.

In the present embodiment, when the narrowband frequency hopping of the first information is enabled, the cells transmitting the first information in the scope of the same subframe set use the same frequency hopping pattern, that is, in the same subframe set, the gap between two narrowbands for transmitting the first information of two different cells is fixed. Each frequency hopping period includes the continuous transmission of 4 times (namely the number of candidate narrowbands for transmitting the first information) of the first information, or includes 4 continuous subframes for transmitting the first information. The indexes of the 4 subframes are from 0 to 3, namely the logical subframe indexes.

When the narrowband frequency hopping of the first information is enabled, determining the narrowband for transmitting the first information according to the PCID includes that: the narrowband for transmitting the first information is determined according to the PCID, and the subframe index or the radio frame index for transmitting the first information; specifically, the narrowband for transmitting the first information is determined according to the formula: m(Idx)=mod($\lfloor$PCID/N$\rfloor$+Idx,M) or m(Idx)=mod(PCID+Idx,M).

wherein, the Idx represents the subframe index or the radio frame index for transmitting the first information, the m(Idx) represents the index of the narrowband for transmitting the first information on the subframe or the radio frame whose index is the Idx, the N is the number of subframe subsets included in the candidate subframe set for transmitting the first information, and the M is the number of narrowbands included in the candidate narrowband set for transmitting the first information.

So, for the cell 0, m(0)=mod(PCID+Idx,M)=mod(0+0,4)=0; that is, it is determined that the narrowband for the cell 0 (PCID=0) to transmit the first information in the frequency hopping period for the first time (the logical subframe index is equal to 0) is the narrowband 0.

By using the same time, the narrowband for the cell 0 to transmit the first information in the frequency hopping period for the second time is the narrowband 1, the narrowband for the cell 0 to transmit the third information in the frequency hopping period for the third time is the narrowband 2, and the narrowband for the cell 0 to transmit the first information in the frequency hopping period for the fourth time is the narrowband 3.

Then, the frequency hopping pattern for the cell 0 to transmit the first information can be represented as: the narrowband 0, the narrowband 1, the narrowband 2 and the narrowband 3.

Similarly, the frequency hopping pattern for the cell 1 to transmit the first information can be represented as: the narrowband 1, the narrowband 2, the narrowband 3 and the narrowband 0;

the frequency hopping pattern for the cell 2 to transmit the first information can be represented as: the narrowband 2, the narrowband 3, the narrowband 0 and the narrowband 1;

the frequency hopping pattern for the cell 3 to transmit the first information can be represented as: the narrowband 3, the narrowband 0, the narrowband 1 and the narrowband 2.

Figure 6:
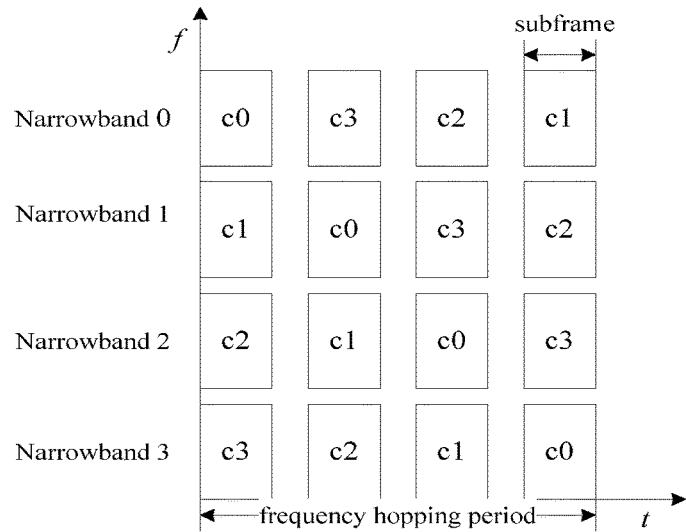
FIG. 6 is a schematic diagram that adjacent cells use the same frequency hopping pattern according to an embodiment of the disclosure.

At last, the cells 0-3 use the same frequency hopping pattern to transmit the first information in the scope of frequency hopping period. As shown in FIG. 6, as such, the subframe or the radio frame for transmitting the first information are not necessary, thereby completely avoiding the mutual interferences caused by the first information transmission between the adjacent cells.

In S102, the first information is sent or received on the subframe set and the narrowband.

Embodiment Six

The present embodiment provides a method for information transmission. The method can be applied to the network side as well as the terminal side. As shown in FIG. 1, the method for information transmission in the present embodiment includes the following steps.

In S101, the subframe set and the narrowband for transmitting the first information are determined according to the PCID.

Before the step, the method further includes that: the candidate subframe set and the candidate narrowband set for transmitting the first information are acquired, wherein the candidate subframe set includes the subframe set, and the candidate narrowband set includes the narrowband.

In the present embodiment, the first information is the SIB1 information.

Acquiring the candidate subframe set and the candidate narrowband set for transmitting the first information includes that:

the preset candidate subframe set and the candidate narrowband set for transmitting the first information are acquired; for the terminal side, except the above way, the candidate subframe set and the candidate narrowband set for transmitting the first information can also be acquired through the MIB signaling.

In the present embodiment, the candidate narrowband set for transmitting the first information is set as including 4 narrowbands whose numbers are from 0 to 3; the candidate subframe set for transmitting the first information is set as including 2 subframe subsets whose numbers are 0 and 1. In the present embodiment, there are 4 cells which are adjacent to each other, and the numbers of the 4 cells are from 0 to 3.

Alternatively, determining the subframe set for transmitting the first information according to the PCID includes that:

the candidate subframe set for transmitting the first information is divided into N subframe subsets; the belonging group of the PCID is determined according to the first rule; the group number n of the belonging group is acquired; and the subframe subset whose number is the same as the group number n is determined as the subframe set for transmitting the first information; wherein, the N is a positive integer, and the n is an integer.

Herein, determining the belonging group of the PCID according to the first rule includes that: the belonging group of the PCID is determined according to the formula: $n=\mod(\lfloor PCID/M \rfloor, N)$;

for the PCID is equal to 0, $n=\mod(\lfloor PCID/M \rfloor, N)=\mod(\lfloor 0/4 \rfloor, 2)=0$;

that is, it is determined that the subframe set for the cell 0 to transmit the first information is the subframe subset whose number is 0;

by using the same method, it is possible to determine that all the subframe sets for the cell 1, the cell 2 and the cell 3 to transmit the first information are the subframe subset whose number is 0.

In the present embodiment, when the narrowband frequency hopping of the first information is enabled, the cells transmitting the first information in the scope of the same subframe set use the different frequency hopping patterns, that is, in the same subframe set, the gap between two narrowbands for transmitting the first information of two different cells is not fixed. Each frequency hopping period includes the continuous transmission of 6 times (namely the number of candidate narrowbands for transmitting the first information) of the first information, or includes 6 continuous subframes for transmitting the first information. The indexes of the 6 subframes are from 0 to 5, namely the logical subframe indexes.

When the narrowband frequency hopping of the first information is enabled, determining the narrowband for transmitting the first information according to the PCID includes that:

the narrowband for transmitting the first information is determined according to the PCID, and the subframe index or the radio frame index for transmitting the first information; in the present embodiment, the random collating sequence S corresponding to the PCID is acquired, and the narrowband for transmitting the first information is determined according to the formula $m(Idx)=S\{\mod(Idx,M)\}$; the random collating sequence S includes M integers from 0 to $(M-1)$; wherein, the $m(Idx)$ represents the index of the narrowband for transmitting the first information on the subframe or the radio frame whose index is the Idx, and the M is the number of narrowbands included in the candidate narrowband set for transmitting the first information.

Acquiring the random collating sequence S corresponding to the PCID includes that:

the pseudorandom sequence c is acquired according to the PCID; the pseudorandom sequence c is intercepted in order, and every continuous D bits are intercepted as a bit set; if the bit set intercepted currently is the same as one of the bit sets intercepted before, the current bit set is abandoned until M different bit sets whose length is D bits are acquired, and the M bit sets are numbered from 0 to $(M-1)$; then, the bit sets numbered from 0 to $(M-1)$ are reordered according to the values, and a number sequence corresponding to the reordered bit sets is the random collating sequence S corresponding to the PCID.

Here, the pseudorandom sequence corresponding to the PCID which is acquired by using the existing pseudorandom sequence generating way is: 00000010000110100001001001111 0 and 100010010110010101000000110101.

Every 10 (D is equal to 10) continuous bits in the pseudorandom sequence c(n) are intercepted and divided into a bit set. The bit sets numbered from 0 to 5 include:

0000001000, 0110100001, 0010011110, 1000100101, 1001010100, 0000110101.

Values of each bit set are acquired and converted into decimal numbers: 8, 417, 158, 549, 596 and 53.

The numbers of the 6 bit sets numbered from 0 to 5 which are reordered in ascending order of the values are 0, 5, 2, 1, 3 and 4.

The pseudorandom sequence S corresponding to the PCID is S={0, 5, 2, 1, 3, 4}.

Alternatively, m(0)=S{mod(Idx,M)}=S{mod(0,6)}=S{0}=0 can be obtained according to the formula: m(Idx)=S{mod(Idx,M)}.

That is, the narrowband for the cell 0 (PCID=0) to transmit the SIB1 message in the frequency hopping period for the first time (the logical subframe index is equal to 0) is the narrowband 0.

Similarly, the narrowband for the cell 0 to transmit the first information in the frequency hopping period for the second time is the narrowband 5;

the narrowband for the cell 0 to transmit the first information in the frequency hopping period for the third time is the narrowband 2;

the narrowband for the cell 0 to transmit the first information in the frequency hopping period for the fourth time is the narrowband 1;

the narrowband for the cell 0 to transmit the first information in the frequency hopping period for the fifth time is the narrowband 3;

the narrowband for the cell 0 to transmit the first information in the frequency hopping period for the sixth time is the narrowband 4;

Then, the frequency hopping pattern for the cell 0 to transmit the first information can be represented as: the narrowband 0, the narrowband 5, the narrowband 2, the narrowband 1, the narrowband 3 and the narrowband 4.

Similarly, the frequency hopping pattern for the cell 1 to transmit the first information can be represented as: the narrowband 0, the narrowband 3, the narrowband 1, the narrowband 2, the narrowband 4 and the narrowband 5;

the frequency hopping pattern for the cell 2 to transmit the first information can be represented as: the narrowband 5, the narrowband 1, the narrowband 0, the narrowband 4, the narrowband 2 and the narrowband 3;

the frequency hopping pattern for the cell 3 to transmit the first information can be represented as: the narrowband 3, the narrowband 1, the narrowband 0, the narrowband 4, the narrowband 2 and the narrowband 5.

Figure 7:
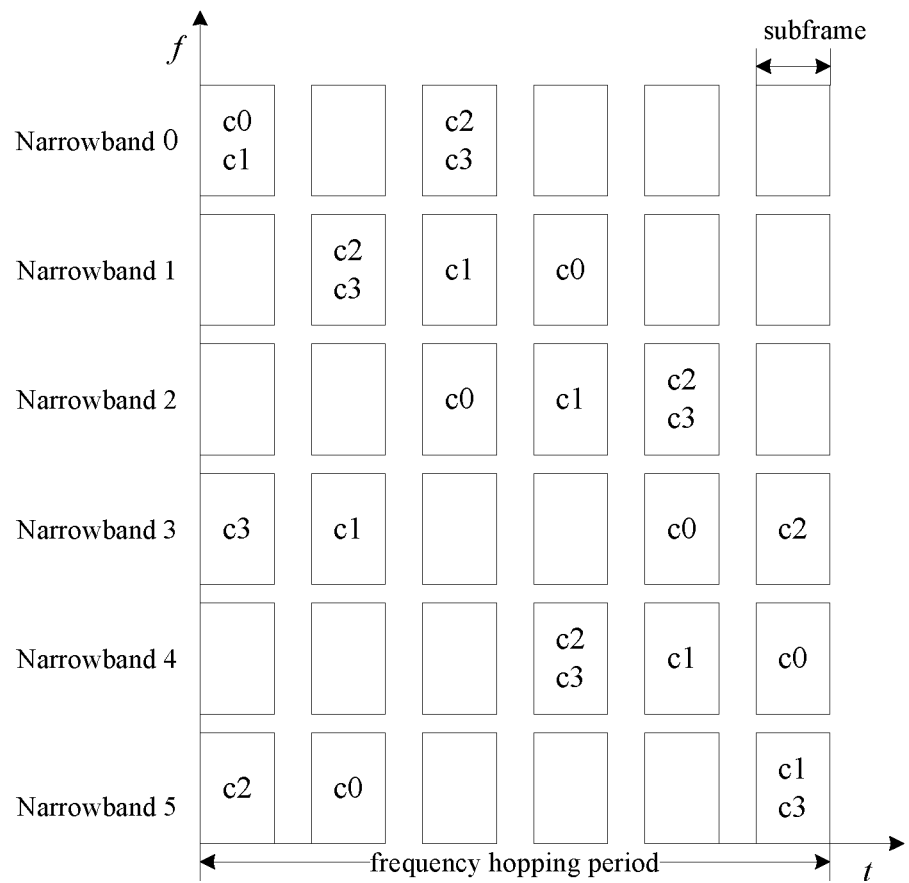
FIG. 7 is a schematic diagram that adjacent cells use different frequency hopping patterns according to an embodiment of the disclosure.

At last, the cells 0-3 use the different frequency hopping patterns to transmit the first information in the scope of frequency hopping period. As shown in FIG. 7, as such, it is beneficial to reducing the mutual interferences caused by the first information transmission between the adjacent cells. It is to be noted that if there are more candidate narrowbands (e.g. more than 10) for transmitting the SIB1 message, the collision probability of the first information transmission between the adjacent cells becomes lower, and then the degree of mutual interferences caused by the first information transmission between the adjacent cells will be lower. So the method is more applied to a scenario where there are enough candidate narrowbands.

An embodiment of the disclosure also provides a computer storage medium, in which a computer executable instruction is stored. The computer executable instruction is used for performing the above method.

Embodiment Seven

Figure 8:
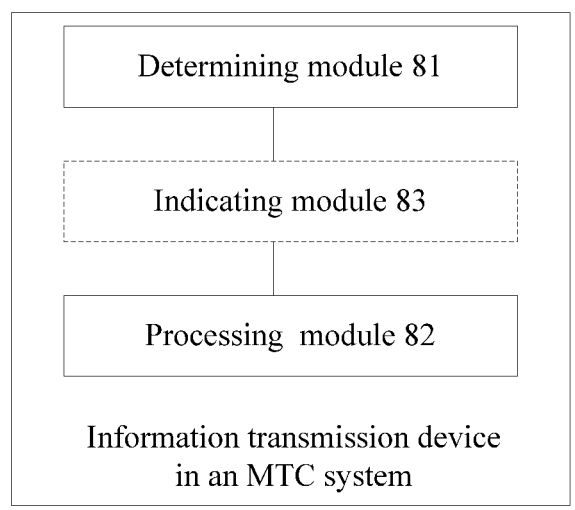
FIG. 8 is a structure diagram of a device for information transmission in an MTC system according to an embodiment of the disclosure.

FIG. 8 is a structure diagram of a device for information transmission in an MTC system according to an embodiment of the disclosure. The device can be applied to the network side as well as the terminal side. As shown in FIG. 8, the device includes: a determining module 81 and a processing module 82.

The determining module 81 is configured to determine the subframe set and the narrowband for transmitting the first information according to the PCID; and the processing module 82 is configured to send or receive the first information on the subframe set and the narrowband.

Alternatively, the determining module 81 is further configured to acquire the candidate subframe set and the candidate narrowband set for transmitting the first information, wherein the candidate subframe set includes the subframe set, and the candidate narrowband set includes the narrowband.

Here, the first information can be the SIB1 information.

The determining module 81 is configured to acquire the preset candidate subframe set and the candidate narrowband set for transmitting the first information. For the terminal side, except the above way, the candidate subframe set and the candidate narrowband set for transmitting the first information can also be acquired through the MIB signaling.

The candidate narrowband set for transmitting the first information includes: all narrowbands defined in the system bandwidth range, or other narrowbands, except the narrowband for PBCH transmission, in the system bandwidth range, or W narrowbands in all the narrowbands defined in the system bandwidth range; the system is the MTC system;

wherein, the W is a positive integer less than or equal to $N_{NB}$, and the $N_{NB}$ is the number of narrowbands defined in the system bandwidth range; alternatively, the W is an even number, and then, the W narrowbands may include W/2 narrowbands close to an upper sideband and W/2 narrowbands close to a lower sideband; for example, for a system bandwidth of 3 MHz or 5 MHz, the W can be preset as 2; for the system bandwidth greater than 5 MHz, the W can be a value greater than or equal to 4.

Alternatively, the determining module 81 is further configured to determine that there is no PBCH transmission in the subframe for transmitting the first information, and set that the candidate narrow set for transmitting the first information includes all the narrowbands in the system bandwidth range; or, the determining module is further configured to determine that there is the PBCH transmission in the subframe for transmitting the first information, and set that the candidate narrow set for transmitting the first information includes other narrowbands, except the narrowbands for the PBCH transmission, in the system bandwidth range.

Alternatively, the MTC system is the FDD system; the determining module 81 is configured to acquire the subframe #0, the subframe #4, the subframe #5 and the subframe #9 in the radio frame, determine that at least one of the subframe #0, the subframe #4, the subframe #5 and the subframe #9 is the candidate subframe, and determine that the subframe set composed of the candidate subframes in all the radio frames is the candidate subframe set for transmitting the first information;

or, the MTC system is the TDD system; the determining module 81 is configured to acquire the subframe #0 and the subframe #5 in the radio frame, determine that at least one of the subframe #0 and the subframe #5 is the candidate subframe, and determine that the subframe set composed of the candidate subframes in all the radio frames is the candidate subframe set for transmitting the first information.

Alternatively, the determining module 81 is further configured to determine the candidate subframe according to at least one of TBS, system bandwidth, functions supported by the cell, the number of narrowbands included in the candidate narrowband set and subframes for the PBCH transmission.

Alternatively, the determining module 81 is configured to divide the candidate subframe set for transmitting the first information into N subframe subsets, determine the belonging group of the PCID according to the first rule, acquire the group number n of the belonging group, and determine the subframe subset whose number is the same as the group number n as the subframe set for transmitting the first information; wherein, the N is a positive integer, and the n is an integer;

the determining module 81 is further configured to acquire the number M of the narrowbands included in the candidate narrowband set, determine the belonging group of the PCID according to the second rule, acquire the group number m of the belonging group, and determine the narrowband whose number is the same as the group number m as the narrowband for transmitting the first information; wherein, the M is a positive integer, and the m is an integer.

Here, the candidate subframe set for transmitting the first information is divided into N subframe subsets, so that each subframe subset includes B subframes in A radio frames, wherein both the A and the B are positive integers.

Alternatively, the first rule is: n=mod(PCID,N); and the second rule is: m=mod($\lfloor$PCID/N$\rfloor$,M). Or, the first rule is: n=mod($\lfloor$PCID/M$\rfloor$,N); and the second rule is: m=mod(PCID,M); wherein, the n and the m are the group numbers of the belonging groups of the PCID determined according to the first rule and the second rule; alternatively, the values of the n and the m are counted from 0.

Alternatively, when the narrowband frequency hopping of the first information is enabled, the determining module 81 is further configured to determine the narrowband for transmitting the first information according to the PCID, and the subframe index and/or the radio frame index for transmitting the first information.

In the first case, in the same subframe set, the gap between two narrowbands for transmitting the first information of two different cells is fixed; and in the second case, in the same subframe set, the gap between two narrowbands for transmitting the first information of two different cells is not fixed.

Herein, in the first case, there is cellular planning, that is, the PCID of the current cell needs to be determined according to the PCID of other adjacent cells; in the second case, there is no cellular planning, that is, the PCID of the current cell has nothing to do with the adjacent cells.

Alternatively, in the first case, the determining module 81 is configured to determine the narrowband for transmitting the first information according to the formula: m(Idx)=mod($\lfloor$PCID/N$\rfloor$+Idx,M) or m(Idx)=mod(PCID+Idx, M).

Wherein, the Idx represents the subframe index or the radio frame index for transmitting the first information, the m(Idx) represents an index of the narrowband for transmitting the first information on the subframe or the radio frame whose index is the Idx, the N is the number of subframe subsets included in the candidate subframe set for transmitting the first information, and the M is the number of narrowbands included in the candidate narrowband set for transmitting the first information.

In the second case, the determining module 81 is configured to acquire the random collating sequence S of the PCID, and determine the narrowband for transmitting the first information according to the formula m (Idx)=S{mod (Idx,M)}; the random collating sequence S includes M integers from 0 to (M−1);

wherein, the m(Idx) represents the index of the narrowband for transmitting the first information on the subframe or the radio frame whose index is the Idx, the M is the number of narrowbands included in the candidate narrowband set for transmitting the first information, and the S{F} represents the Fth element in the sequence S; the F is an integer greater than 0 and less than M−1, or the F is equal to 0, or the F is equal to M−1.

Alternatively, the determining module 81 is configured to acquire the corresponding pseudorandom sequence c according to the PCID, intercept the pseudorandom sequence c in order, and intercept every continuous D bits as a bit set; the determining module 81 is further configured to, if the bit set intercepted currently is the same as one of the bit sets intercepted before, abandon the current bit set until the pseudorandom sequence c is intercepted to acquire M bit sets whose length is D bits, and number the M bit sets from 0 to (M−1), and then reorder the bit sets numbered from 0 to (M−1) according to the values; the number sequence corresponding to the reordered bit sets is the random collating sequence S corresponding to the PCID.

The determining module 81 is configured to reorder the bit sets numbered from 0 to (M−1) in descending order of the values, or reorder the bit sets numbered from 0 to (M−1) in ascending order of the values.

Alternatively, the device further includes an indicating module 83, which is configured to use, through the first information, the independent configuration signaling to indicate the actual transmission subframe of the second information in the corresponding SI window.

Alternatively, the indicating module 83 is further configured to divide the candidate subframe set for transmitting the second information in the SI window into X subframe subsets in the first way or the second way, and determine that the actual transmission subframe of the second information in the corresponding SI window is at least one of the X subframe subsets; wherein, the first way is different from the second way, and the X is a positive integer.

Herein, the first way can be the discontinuous subframe allocation way; correspondingly, the indicating module 83 is configured to divide every X continuous subframes in the candidate subframe set into a group; the subframe subset whose number is x is composed of the subframes whose number is x in each subframe group, that is, the gap between adjacent subframes in any subframe subset is X−1; wherein, the x is an integer greater than 0 and less than X−1, or the x is equal to 0, or the x is equal to X−1.

The second way can be the continuous subframe allocation way; correspondingly, the indicating module 83 is configured to divide every ceiling(P/X) continuous subframes in the candidate subframe set into a group; the subframe subset whose number is x is the divided subframe group whose number is x; wherein, the P represents the number of subframes included in the candidate subframe set, the ceiling represents an operation of rounding up to an integer, the x is an integer greater than 0 and less than X−1, or the x is equal to 0, or the x is equal to X−1.

The X is the preset constant, and can be set according to the size of the SI window or according to actual needs. For the terminal side, the value of the X can also be indicated through the first information. Generally, the bigger SI window corresponds to the larger value of the X.

The actual transmission subframe of the second information in the corresponding SI window depends on the current coverage enhancement level or covering target, or TBS of the second information.

Alternatively, when the MTC system is the FDD system, the candidate subframe set includes the subframe #4 and the subframe #5 in all the radio frames, and the scheduling period of the first information is 8 radio frames, the first information is transmitted repeatedly in the scheduling period for 4 times; correspondingly, the determining module is configured to determine the subframe set for transmitting the first information according to the PCID, and determine, according to the PCID and the radio frame index, that the subframe for transmitting the first information in the radio frame of the frame type is the subframe #4 or the subframe #5;

or, the first information is transmitted repeatedly in the scheduling period for 8 times; correspondingly, the determining module is configured to determine, according to the PCID and the radio frame index, that the subframe for transmitting the first information in the radio frame is the subframe #4 or the subframe #5.

Alternatively, when the MTC system is the TDD system, the candidate subframe set includes the subframe #0 and the subframe #5 in all the radio frames, and the scheduling period of the first information is 8 radio frames, the first information is transmitted repeatedly in the scheduling period for 4 times; correspondingly, the determining module is configured to determine the frame type of the radio frame for transmitting the first information according to the PCID, and determine that the subframe for transmitting the first information in the radio frame of the frame type is the subframe #0 or the subframe #5;

or, the first information is transmitted repeatedly in the scheduling period for 8 times; correspondingly, the determining module is configured to determine, according to the PCID and the radio frame index, that the subframe for transmitting the first information in the radio frame is the subframe #0 or the subframe #5.

It is to be noted that the above description related to the device is similar to the description of the method, and the beneficial effects of the device are the same as that of the method, so they will not be repeated here. For the technical details undisclosed in the embodiment of the device in the disclosure, refer to the description of the embodiment of the method.

In the embodiments of the disclosure, all of the determining module 81, the processing module 82, the indicating module 83 can be realized by a Central Processing Unit (CPU), or a Digital Signal Processor (DSP), or a Field Programmable Gate Array (FPGA), or an Application Specific Integrated Circuit (ASIC) in the terminal.

Those ordinary skill in the art may understand that all or part of the steps in the method can be performed by related hardware (e.g. a processor) instructed through a program. The program may be stored in computer readable storage media, such as a read-only memory, a magnetic disk or a compact disk. Alternatively, all or part of the steps of the embodiments may also be implemented by using one or multiple integrated circuits. Correspondingly, each module/unit in the embodiments may be implemented in the form of hardware, for example, its corresponding function is implemented through an integrated circuit, or in the form of software function module, for example, its corresponding function is implemented by executing programs/instructions stored in a memory through a processor. The disclosure is not limited to any particular combination of hardware and software.

Those ordinary skilled in the art should understand that the technical solutions of the disclosure can be modified or replaced equivalently without departing from their spirit and scope; and these modifications and equivalent replacements shall fall within the scope of claims of the disclosure.

INDUSTRIAL APPLICABILITY

The above technical solutions can effectively prevent or reduce the interferences caused by the system information transmission between the adjacent cells, thereby improving user experience.

What is claimed is:

1. A method for information transmission in a Machine Type Communication (MTC) system, comprising:
   acquiring a candidate subframe set and a candidate narrowband set for transmitting first information;
   determining, in the candidate subframe set and the candidate narrowband set, a subframe set and a narrowband for transmitting the first information according to a Physical Cell Identity (PCID); and
   sending or receiving the first information on the subframe set and the narrowband;
   wherein determining the subframe set and the narrowband for transmitting the first information according to the PCID comprises:
   dividing the candidate subframe set for transmitting the first information into N subframe subsets, determining a belonging group of the PCID according to a first rule, acquiring a group number n of the belonging group of the PCID, and determining a subframe subset whose number is the same as the group number n as the subframe set for transmitting the first information; wherein, the N is a positive integer, and the n is an integer less than the N;
   acquiring the number M of the narrowbands comprised in the candidate narrowband set, determining the belonging group of the PCID according to a second rule, acquiring a group number m of the belonging group of the PCID, and determining a narrowband whose number is the same as the group number m as the narrowband for transmitting the first information; wherein, the M is a positive integer, and the m is an integer less than the M.

2. The method as claimed in claim 1, wherein acquiring the candidate narrowband set for transmitting the first information comprises:
   acquiring all narrowbands in a preset system bandwidth range, or acquiring other narrowbands, except the narrowbands for Physical Broadcast Channel (PBCH) transmission, in a preset system bandwidth range, or acquiring W narrowbands of all the narrowbands in the preset system bandwidth range;
   wherein, the W is a positive integer less than or equal to $N_{NB}$, and the $N_{NB}$ is the number of narrowbands in the system bandwidth range.

3. The method as claimed in claim 2, wherein the W is an even number; the W narrowbands comprise W/2 narrowbands close to an upper sideband and W/2 narrowbands close to a lower sideband.

4. The method as claimed in claim 2, further comprising:
before acquiring the candidate narrowband set for transmitting the first information, determining that there is no PBCH transmission in a subframe for transmitting the first information, and setting that the candidate narrow set for transmitting the first information comprises all the narrowbands in the system bandwidth range; or, determining that there is the PBCH transmission in the subframe for transmitting the first information, and setting that the candidate narrow set for transmitting the first information comprises other narrowbands, except the narrowbands for the PBCH transmission, in the system bandwidth range.

5. The method as claimed in claim 1, wherein acquiring the candidate subframe set for transmitting the first information comprises:
when the MTC system is a Frequency Division Duplex (FDD) system, acquiring subframe subframe #4, subframe #5 and subframe #9 in a radio frame, determining that at least one of the subframe #0, the subframe #4, the subframe #5 and the subframe #9 is a candidate subframe, and determining that the subframe set composed of the candidate subframes in all the radio frames is the candidate subframe set for transmitting the first information;
or, when the MTC system is a Time Division Duplex (TDD) system; acquiring the subframe #0 and the subframe #5 in the radio frame, determining that at least one of the subframe #0 and the subframe #5 is the candidate subframe, and determining that the subframe set composed of the candidate subframes in all the radio frame is the candidate subframe set for transmitting the first information.

6. The method as claimed in claim 5, wherein when the MTC system is the TDD system, the candidate subframe set comprises the subframe #0 and the subframe #5 in all the radio frames; and the scheduling period of the first information is 8 radio frames,
the first information is transmitted repeatedly in the scheduling period for 4 times; wherein determining the subframe set for transmitting the first information according to the PCID comprises:
determining the frame type of the radio frame for transmitting the first information according to the PCID, and determining, according to the PCID and the radio frame index, that the subframe for transmitting the first information in the radio frame of the frame type is the subframe #0 or the subframe #5;
or, the first information is transmitted repeatedly in the scheduling period for 8 times; wherein determining the subframe set for transmitting the first information according to the PCID comprises:
determining, according to the PCID and the radio frame index, that the subframe for transmitting the first information in the radio frame is the subframe #0 or the subframe #5.

7. The method as claimed in claim 1, wherein determining the belonging group of the PCID according to the first rule comprises:
determining the belonging group of the PCID according to a formula: $n=\mathrm{mod}(PCID,N)$;
wherein determining the belonging group of the PCID according to the second rule comprises: determining the belonging group of the PCID according to a formula: $m=\mathrm{mod}(\lfloor PCID/N \rfloor, M)$;
wherein, the n and the m are the group numbers of the belonging groups of the PCID, the N is the number of subframe subsets comprised in the candidate subframe set, and the M is the number of narrowbands comprised in the candidate narrowband set;
wherein determining the belonging group of the PCID according to the first rule comprises:
determining the belonging group of the PCID according to a formula: $n=\mathrm{mod}(\lfloor PCID/M \rfloor, N)$;
wherein determining the belonging group of the PCID according to the second rule comprises: determining the belonging group of the POD according to a formula: $m=\mathrm{mod}(PCID,M)$;
wherein, the n and the m are the group numbers of the belonging groups of the PCID, the N is the number of subframe subsets comprised in the candidate subframe set, and the M is the number of narrowbands comprised in the candidate narrowband set.

8. The method as claimed in claim 1, wherein when narrowband frequency hopping of the first information is enabled, determining the narrowband for transmitting the first information according to the PCID comprises:
determining the narrowband for transmitting the first information according to the PCID, and a subframe index and/or a radio frame index for transmitting the first information.

9. The method as claimed in claim 8, wherein,
in a first case, in the same subframe set, a gap between two narrowbands for transmitting the first information of two different cells is fixed;
in a second case, in the same subframe set, the gap between two narrowbands for transmitting the first information of two different cells is not fixed; the first case is different from the second case.

10. The method as claimed in claim 9, wherein in the first case, determining the narrowband for transmitting the first information according to the PCID, and the subframe index and/or the radio frame index for transmitting the first information comprises:
determining the narrowband for transmitting the first information according to a formula: $m(Idx)=\mathrm{mod}(\lfloor PCID/N \rfloor + Idx, M)$ or $m(Idx)=\mathrm{mod}(PCID+Idx,M)$;
wherein, the Idx represents the subframe index or the radio frame index for transmitting the first information, the m(Idx) represents an index of the narrowband for transmitting the first information on the subframe or the radio frame whose index is the Idx, the N is the number of subframe subsets comprised in the candidate subframe set for transmitting the first information, and the M is the number of narrowbands comprised in the candidate narrowband set for transmitting the first information.

11. The method as claimed in claim 9, wherein in the second case, determining the narrowband for transmitting the first information according to the PCID, and the subframe index and/or the radio frame index for transmitting the first information comprises:
acquiring a random collating sequence S corresponding to the PCID, and determining the narrowband for transmitting the first information according to a formula $m(Idx)=S\{\mathrm{mod}(Idx,M)\}$; the random collating sequence S comprises M integers from 0 to (M−1);
wherein, the m(Idx) represents the index of the narrowband for transmitting the first information on the subframe or the radio frame whose index is the Idx, and the M is the number of narrowbands comprised in the candidate narrowband set for transmitting the first information.

12. The method as claimed in claim 1, further comprising:
dividing a candidate subframe set for transmitting the second information in a System Information (SI) window into X subframe subsets in a first way or a second way, and determining that the actual transmission subframe of the second information in the corresponding SI window is at least one of the X subframe subsets; wherein, the first way is different from the second way, and the X is a positive integer;
using, through the first information, independent configuration signaling to indicate an actual transmission subframe of second information in the corresponding SI window.

13. The method as claimed in claim 12, wherein the first way is a discontinuous subframe allocation way; dividing the candidate subframe set for transmitting the second information in the SI window into X subframe subsets in the first way comprises:
dividing every X continuous subframes in the candidate subframe set into a group, and numbering the subframes in each group; the subframe subset whose number is x is composed of the subframes whose number is x in each subframe group; wherein, the X is a positive integer, and the x is an integer less than or equal to X−1.

14. The method as claimed in claim 12, wherein the second way is a continuous subframe allocation way; dividing the candidate subframe set for transmitting the second information in the SI window into X subframe subsets in the second way comprises:
dividing every ceiling(P/X) continuous subframes in the candidate subframe set into a group; the subframe subset whose number is x is the divided subframe group whose number is x; wherein, the P represents the number of subframes comprised in the candidate subframe set, the X is a positive integer, and the x is an integer less than or equal to X−1.

15. The method as claimed in claim 12, wherein the independent configuration signaling indicates that the number of bits required by the actual transmission subframe of the second information in the corresponding SI window is Y; Y=$2^X$−1 or Y=ceiling($\log_2$ X), wherein the X is the number of subframe sets comprised in the candidate subframe set for transmitting the second information in the SI window, and is a positive integer;
wherein there is a one-to-one correspondence between Y bits and K subframe subsets of X subframe subsets, and the K is a positive integer less than or equal to X;
wherein Y=ceiling($\log_2$ X), and the K subframe subsets are the subframe subsets whose indexes are from 0 to K−1 in the X subframe subsets.

16. A device for information transmission in a Machine Type Communication (MTC) system, comprising: a determining module and a processing module;
the determining module is configured to acquire a candidate subframe set and a candidate narrowband set for transmitting first information, and determine, in the candidate subframe set and the candidate narrowband set, a subframe set and a narrowband for transmitting the first information according to a Physical Cell Identity (PCID); and
the processing module is configured to send or receive the first information on the subframe set and the narrowband;
wherein the determining module is configured to determine the subframe set and the narrowband for transmitting the first information according to the PCID by implementing the following process: dividing the candidate subframe set for transmitting the first information into N subframe subsets, determining a belonging group of the PCID according to a first rule, acquiring a group number n of the belonging group of the PCID, and determining a subframe subset whose number is the same as the group number n as the subframe set for transmitting the first information; wherein, the N is a positive integer, and the n is an integer;
acquiring the number M of the narrowbands comprised in the candidate narrowband set, determining the belonging group of the PCID according to a second rule, acquiring a group number m of the belonging group of the PCID, and determining a narrowband whose number is the same as the group number m as the narrowband for transmitting the first information; wherein, the M is a positive integer, and the m is an integer.

17. The device as claimed in claim 16, wherein the determining module is configured to acquire the candidate narrowband set for transmitting the first information by implementing the following process:
acquiring all narrowbands in a preset system bandwidth range, or acquiring other narrowbands, except the narrowbands for Physical Broadcast Channel (PBCH) transmission, in a preset system bandwidth range, or acquiring W narrowbands of all the narrowbands in the preset system bandwidth range;
wherein, the W is a positive integer less than or equal to $N_{NB}$, and the $N_{NB}$ is the number of narrowbands in the system bandwidth range.

18. The device as claimed in claim 17, wherein the W is an even number; the W narrowbands comprise W/2 narrowbands close to an upper sideband and W/2 narrowbands close to a lower sideband.

19. The device as claimed in claim 17, the determining module is further configured to, before acquiring the candidate narrowband set for transmitting the first information, determine that there is no PBCH transmission in a subframe for transmitting the first information, and set that the candidate narrow set for transmitting the first information comprises all the narrowbands in the system bandwidth range; or, the determining module is further configured to determine that there is the PBCH transmission in the subframe for transmitting the first information, and set that the candidate narrow set for transmitting the first information comprises other narrowbands, except the narrowbands for the PBCH transmission, in the system bandwidth range.

\* \* \* \* \*